(12) United States Patent
Sano et al.

(10) Patent No.: US 6,172,959 B1
(45) Date of Patent: Jan. 9, 2001

(54) OPTICAL INFORMATION PROCESSING APPARATUS

(75) Inventors: Kousei Sano, Neyagawa; Shin-ichi Tanaka, Kyotanabe; Shin-ichi Kadowaki, Sanda, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/187,862

(22) Filed: Nov. 6, 1998

(51) Int. Cl.[7] .................................................. G11B 7/00
(52) U.S. Cl. ........................................ 369/124.01; 369/54
(58) Field of Search .................................. 369/13, 47, 48, 369/54, 58, 93, 124.01, 124.02, 124.04

(56) References Cited

U.S. PATENT DOCUMENTS 5,587,985   12/1996   Sano et al. ............................ 369/124

FOREIGN PATENT DOCUMENTS 06290496   10/1994   (JP) .
10092039   4/1998   (JP) .
10092047   4/1998   (JP) .

OTHER PUBLICATIONS

T. Shiratori et al.; ISOM 97 Tu–E–04, pp. 38–39, "High–Density Magneto–Optical Recording With Domain Wall Displacement Detection".

Primary Examiner—Paul W. Huber
(74) Attorney, Agent, or Firm—Renner, Otto, Boisselle & Sklar

(57) ABSTRACT

An optical information processing apparatus includes: an optical head for radiating a light beam onto an information storage medium and generating a reproduction signal from the light beam reflected an/or diffracted from the information storage medium, the information storage medium carrying optically readable information recorded thereon; a transportation member for causing a relative movement of the optical head with respect to the information storage medium; and a signal processing circuit for receiving the reproduction signal generated by the optical head and processing the reproduction signal. The reproduction signal obtained from the information storage medium irradiated with the light beam includes first information from a mark near a boundary between a region which is heated by the light beam to no less than a predetermined temperature and a first region which is at a temperature below the predetermined temperature, and second information from a mark near a boundary between the region which is heated to no less than the predetermined temperature and a second region which is at a temperature below the predetermined temperature. The signal processing circuit separates the first information from the second information, or vice versa, thereby obtaining from the reproduction signal the information recorded on the information storage medium.

11 Claims, 22 Drawing Sheets

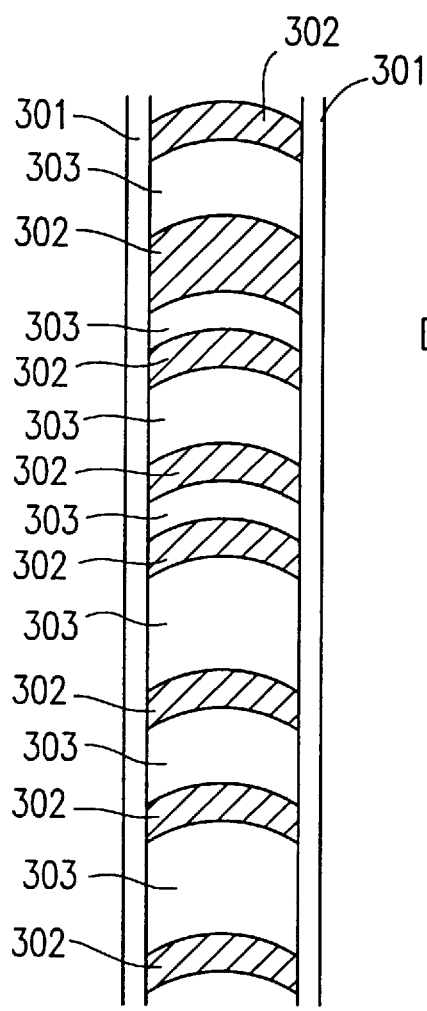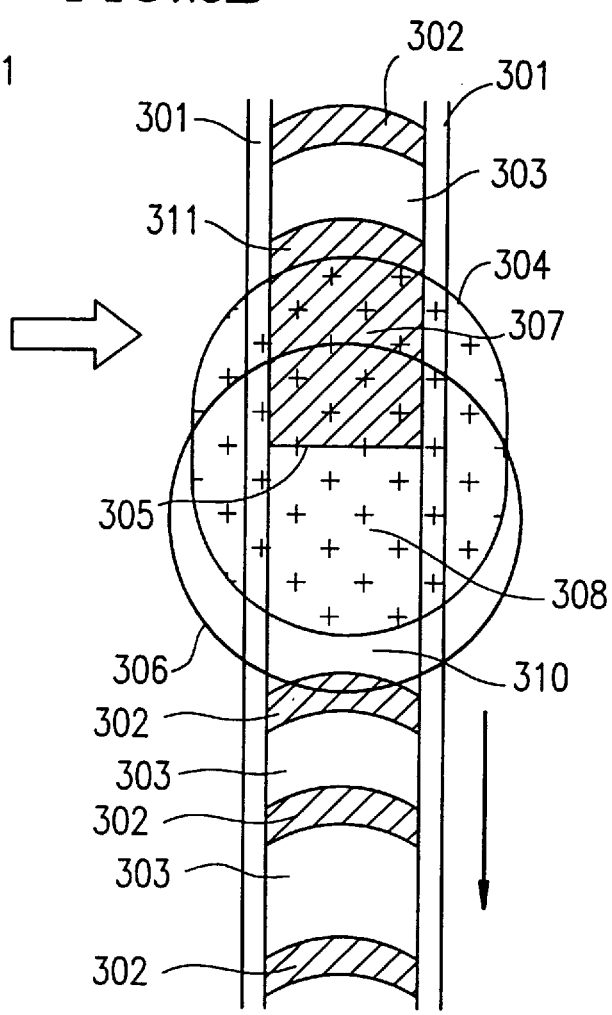

Output signal (S1) from optical head

Signal coupled to negative input of differential circuit 201

Signal output at terminal 104

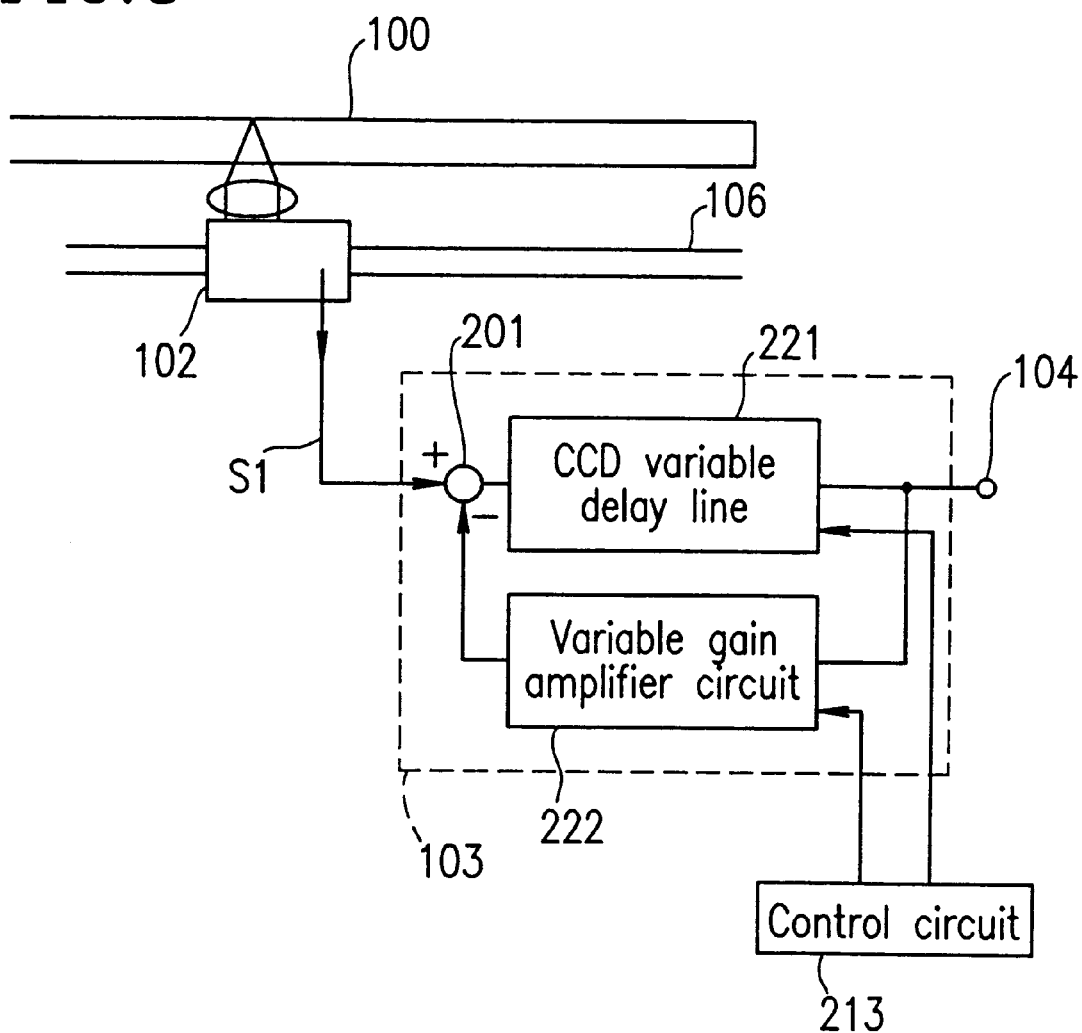

Output signal (S1) from optical head

Signal coupled to negative input of differential circuit 201

$h2 = \alpha \times h1$

Signal S2 from terminal 104

$h3 = \alpha^2 \times h1$

OPTICAL INFORMATION PROCESSING APPARATUS

BACKGROUND OF THE INVENTION

1. Field of the Invention

The present invention relates to an optical information processing apparatus for recording and reproducing information on an information storage medium capable of optical recording and reproduction of information, e.g., optical disks or optical cards.

2. Description of the Related Art

In the field of optical memory technologies utilizing optical disks or optical cards, there is an increasing variety of applications including digital audio disks, video disks, data files, and the like. According to optical memory technologies, the information on an information storage medium can be reproduced by using a fine beam of light to read minute convex and concave portions, or marks and spaces (which have distinguishable physical properties from each other) provided on the medium.

FIG. 22 is a diagram illustrating the relationship between aforementioned marks and a fine light beam, where information is recorded based on differential orientations of magnetization on an optical disk as an information storage medium. Hatched regions 302 are marks (A), and blank regions 303 are marks (B), such that marks (A) and marks (B) have different magnetization orientations. A series of repetition of marks (A) 302 and marks (B) 303 are defined as a track. Information can be reproduced as a converged light beam 306 travels over a track.

The size of the converged light beam 306 is a function of the numerical aperture (NA) and wavelength ($\lambda$) of the optical system. If a mark length (defined as the length of mark (A) 302 or mark (B) 303 along the longitudinal direction of tracks) is too small relative to the size of the light beam 306, it becomes difficult to obtain enough modulation of a reproduction signal which is output from an optical head. Therefore, selecting a small minimum mark length for increased recording density results in an increased intersymbol interference (which is essentially the influence from preceding and subsequent marks), thereby making it difficult to maintain a low error rate in the reproduction of information.

Accordingly, a method (Japanese Laid-open Publication No. 6-290496; see ISOM '97 lecture proceedings (Tu~E-04)) has been proposed which virtually enlarges recorded marks to the size of alight beam before reproduction of information.

However, such conventional methods have a problem in that, during reproduction of information recorded on an information storage medium, the generation of specific signal waveforms causes an increase in the error rate in the signal reproduction by a signal reproduction circuit.

SUMMARY OF THE INVENTION

An optical information processing apparatus according to the present invention includes: an optical head for radiating a light beam onto an information storage medium and generating a reproduction signal from the light beam reflected and/or diffracted from the information storage medium, the information storage medium carrying optical readable information recorded thereon; a transportation member for causing a relative movement of the optical head with respect to the information storage medium; and a signal processing circuit for receiving the reproduction signal generated by the optical head and processing the reproduction signal, wherein the reproduction signal includes first information from a mark near a boundary between a region which is heated by the light beam to no less than a predetermined temperature and a first region which is at a temperature below the predetermined temperature, and second information from a mark near a boundary between the region which is heated to no less than the predetermined temperature and a second region which is at a temperature below the predetermined temperature, and wherein the signal processing circuit separates the first information from the second information, or vice versa, thereby obtaining from the reproduction signal the information recorded on the information storage medium.

In one embodiment of the invention, the reproduction signal is a sum of X plus Y, where X is the information signal recorded in the information storage medium and Y is a signal which is obtained by delaying the information signal and multiplying the information delayed information signal by a constant.

In another embodiment of the invention, the signal processing circuit has a transfer function represented by:

$$1/\{1+A\cdot\exp(-j\omega T)\}$$

where A is a constant; j is the imaginary unit; $\omega$ is an angular frequency of the reproduction signal generated by the optical head; and T is a delay time.

In still another embodiment of the invention, the signal processing circuit has a transfer function represented by:

$$1-A\cdot\exp(-j\omega T)$$

where A is a constant; j is the imaginary unit; $\omega$ is an angular frequency of the reproduction signal generated by the optical head; and T is a delay time.

In still another embodiment of the invention, the signal processing circuit is optimized so as to minimize a jitter of the reproduction signal having been processed by the signal processing circuit.

In still another embodiment of the invention, the signal processing circuit is optimized so as to maximize an eye pattern opening of the reproduction signal having been processed by the signal processing circuit.

In still another embodiment of the invention, the optical information processing apparatus further includes the information storage medium, the information storage medium including a magnetic recording film for storing a signal in the form of magnetization orientation, enlargement of the marks being effected by movement of a magnetic partition, and the optical head detecting the magnetization orientation of the magnetic recording film and outputting the reproduction signal.

In still another embodiment of the invention, the constant A and the delay time T are determined so as to minimize a jitter of the reproduction signal having been processed by the signal processing circuit.

In still another embodiment of the invention, the constant A and the delay time T are determined so as to maximize an eye pattern opening of the reproduction signal having been processed by the signal processing circuit.

Thus, the invention described herein makes possible the advantage of providing an optical information processing apparatus having a low error rate during reproduction.

This and other advantages of the present invention will become apparent to those skilled in the art upon reading and understanding the following detailed description with reference to the accompanying figures.

BRIEF DESCRIPTION OF THE DRAWINGS

FIG. 2A is a schematic diagram showing marks on a track of an optical disk 100.

FIG. 2B is a schematic diagram showing the relationship between the marks shown in FIG. 2A and a light beam.

FIG. 5 is a block diagram illustrating an embodiment of the invention where a CCD variable delay line 221 is employed as a delay circuit in a signal processing circuit 103.

FIG. 15 is a block diagram illustrating the structure of an eye opening detection circuit 214a.

FIG. 16 is a waveform diagram illustrating the waveforms at various points of the eye opening detection circuit 214a.

DESCRIPTION OF THE PREFERRED EMBODIMENTS

Hereinafter, the present invention will be described by way of examples and with reference to FIGS. 1 to 21A–21D. Throughout the figures, like numerals represent component elements with like functions.

(Example 1)

Figure 1:
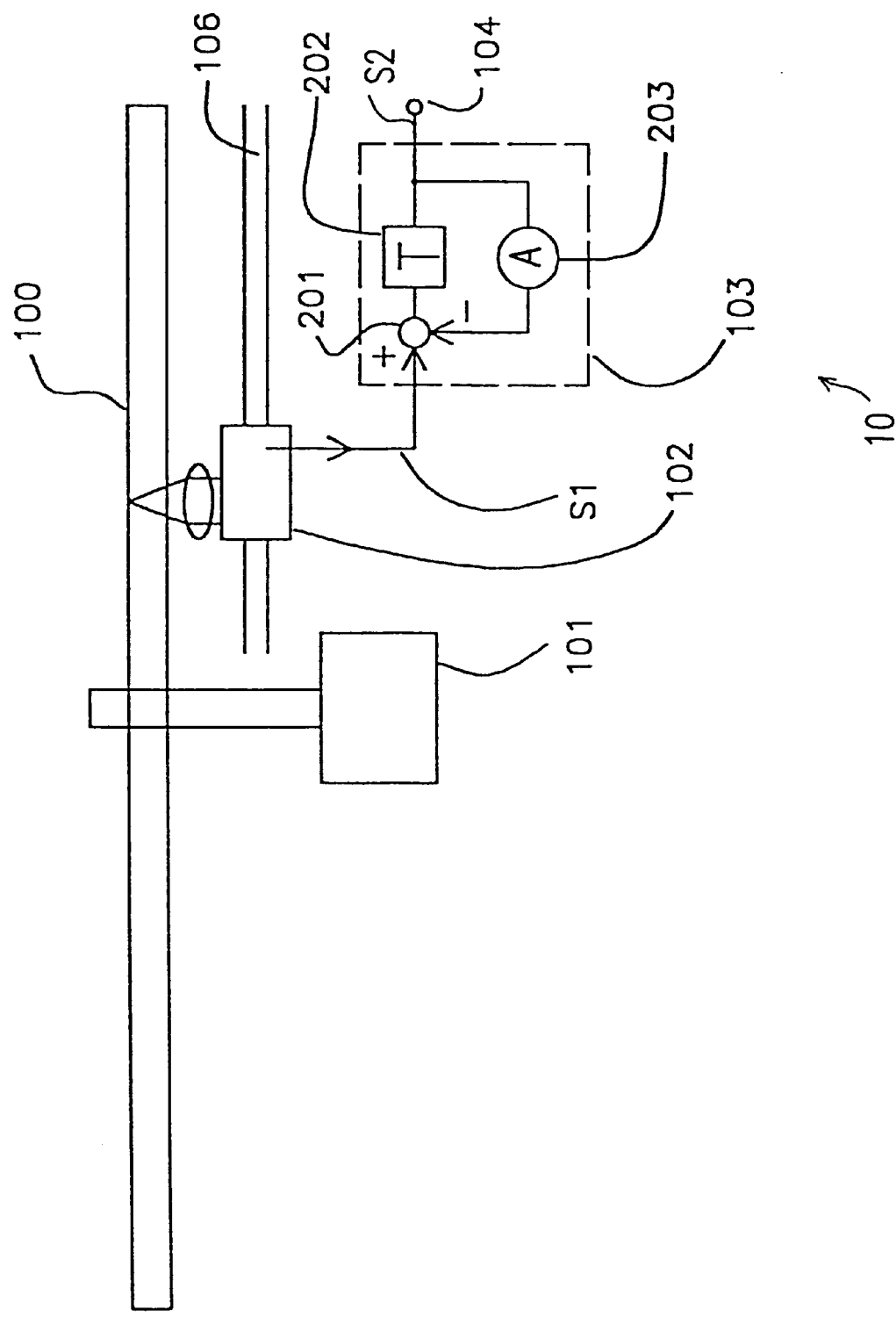
FIG. 1 is a block diagram illustrating the structure of an optical information processing apparatus 10 according to Example 1 of the present invention.

FIG. 1 is a block diagram illustrating the structure of an optical information processing apparatus 10 according to Example 1 of the present invention.

The optical information processing apparatus 10 includes: an optical head 102 for radiating a light beam onto an information storage medium 100 and generating a reproduction signal S1 from the reflected and/or diffracted light beam; a transportation member 106 for moving the optical head 102 relative to the information storage medium 100; and a signal processing circuit 103 for receiving and processing the reproduction signal S1 from the optical head 102.

The optical disk (information storage medium) 100 is rotated by a motor 101. The optical head 102 is moved along the radius direction and/or the tangential direction of the optical disk 100 by a traverse system (transportation member) 105. As a result, the optical head 102 can access information which is recorded in a portion of the optical disk 100. The light beam outgoing from the optical head 102 receives optical effects from the optical disk 100, e.g., diffraction or rotation of the polarization plane, and is reflected therefrom so as to return to the optical head 102. The light is detected by an optical detector within the optical head 102 and output as the reproduction signal S1. The reproduction signal S1 output from the optical head 102 is input to the signal processing circuit 103.

The signal processing circuit 103 has a transfer function which can be represented by:

$$1/\{1+A'\exp(-j\omega T)\}$$

where A is a constant; j is the imaginary unit; ω is an angular frequency; and T is a delay time.

As shown in FIG. 1 the signal processing circuit 103 includes a differential circuit 201, a delay circuit 202, and an amplifier circuit 203 (indicated as having a gain A) for amplifying the output from the delay circuit 202 by A times. The differential circuit 201 derives a difference between an input signal to the signal processing circuit 103 and the output signal from the delay circuit 202. The output from the differential circuit 201 is input to the delay circuit 202 so that the output from the delay circuit 202 is output as a processed reproduction signal S2 at a terminal 104. The processed reproduction signal S2 which is output via the terminal 104 is digitized and input to a decoder circuit (not shown), an error correction circuit (not shown) and the like, so as to be output as a data file or an audio or video signal.

Based on the reproduced signal S1 output from the optical head 102 or the reproduced signal S2 output from the signal processing circuit 103, a control circuit (not shown) may perform the focusing control of the light beam, tracking control, and/or control of the rotation number of the motor 101.

Hereinafter, a method for reading information stored on the optical disk 100 will be described with reference to FIGS. 2A and 2B. The method described below is based on the principle of magnetic region enlargement reproduction.

FIG. 2A is a schematic diagram showing marks on a track of the optical disk 100 where the track is not irradiated with a light beam. FIG. 2B is a schematic diagram showing the relationship between the marks and a light beam, illustrating the state of the track shown in FIG. 2A during information reproduction by irradiation with the light beam.

Information may be recorded as magnetization orientations of a magnetic recording film provided on the optical disk 100. As used herein, an area within which substantially only one magnetization orientation can be observed will be termed a "magnetic region", while a boundary orientations will be termed a "magnetic partition".

In FIGS. 2A and 2B, hatched regions 302 are marks (A), and blank regions 303 are marks (B), such that marks (A) and marks (B) are magnetic regions having different magnetization orientations. Each track is delimited by grooves 301. It is assumed that no magnetic recording film is present on the grooves 301, and that no magnetic partitions are formed in the boundaries between the grooves 301 and the marks 302 or 303.

It is further assumed in the present example that the magnetic recording film for recording magnetization orientations includes three layers (i.e. a read layer, intermediate layer, and a recording layer) along the optical axis or vertical direction, as disclosed in ISOM '97 lecture proceedings (Tu-E-04) and Japanese Laid-open Publication No. 6-290496, supra. The read layer, intermediate layer, and recording layer are positioned in this order so that the read layer substantially defines a surface which is actually irradiated with a light beam.

When no light beam is radiated, the magnetic orientations recorded in the recording layer are transcribed onto the intermediate and read layers so that the three layers share the same magnetic orientations. FIG. 2A shows the read layer in this state.

During information reproduction, the temperature of the surface of the optical disk 100 increases due to light irradiation. FIG. 2B shows the state of the magnetic regions during light irradiation. As shown, the light beam 306 makes a relative downward movement in FIG. 2B along the illustrated track of the optical disk 100. With some lag behind the light beam 306, an elliptic region 304 of high temperature follows. Thus, the high temperature region 304 is slightly dislocated from the light beam 306 as shown in FIG. 2B.

The intermediate layer of the magnetic recording layer is formed of a material which behaves as a paramagnetic material at the temperature of the high temperature region 304. As a result, the correlation in magnetic orientation between the recording layer and the read layer is lost within the high temperature region 304. At the same time, the magnetic partitions in the read layer receive a force which is in proportion with the temperature gradient on the disk surface. As a result, a magnetic region 308 (307) (having the same magnetic orientation as that which is recorded in the region lying immediately outside the high temperature region 304) emerges which extends from ahead of (behind) the high temperature region 304 to a point having the highest temperature within the high temperature region 304.

Since no magnetic partitions are formed at the boundaries between the groove 301 and the marks 302 or 303, a magnetic partition 305 emerges across the point of highest temperature so as to extend perpendicularly to the track direction (i.e., so as to run the shortest distance between two grooves 301). As a result, what is actually a small mark appears enlarged so as to have a length which is substantially half of the longitudinal length of the high temperature region 340.

As mentioned above, the light beam 306 used for information reproduction always travels ahead of the high temperature region 304. Therefore, a majority of the spot created by the light beam is on the enlarged magnetic region 308, thereby enabling reproduction of the information recorded therein. The details of this method are described in Japanese Laid-open Publication No. 6-290496, supra.

However, both of the magnetic regions lying ahead of and behind the high temperature region 304, respectively are enlarged. Therefore, the light beam 306 will reproduce not only the information stored in the magnetic region 308 but also the information stored in the magnetic region 307 in the case where the relative dislocation between the magnetic partition 305 and the center of the light beam 306. As a result, the information from both of the enlarged marks ahead of and behind the light beam 306 may be mixed in the reproduction signal S1 output from the optical head 102. In other words, the reproduction signal S1 which is obtained by the irradiation of the light beam 306 may contain first information from a mark near the boundary between the region 304 which is heated by the light beam 306 to a predetermined temperature or above and a first region 310 which is at a temperature below the predetermined temperature, as well as second information from a mark near the boundary between the region 304 which is heated to the predetermined temperature or above and a second region 311 which is at a temperature below the predetermined temperature. Specifically, the mark near the boundary between the region 304 and the first region 310 below the predetermined temperature is influenced by a mark in the first region 310; and the mark near the boundary between the region 304 and the second region 311 below the predetermined temperature is influenced by a mark in the second region 311.

Since the reproduction signal S1 output from the optical head 102 may contain both the first and second information, the reproduced information is susceptible to intersymbol interference, possibly resulting in an increased signal error rate.

Figure 3:
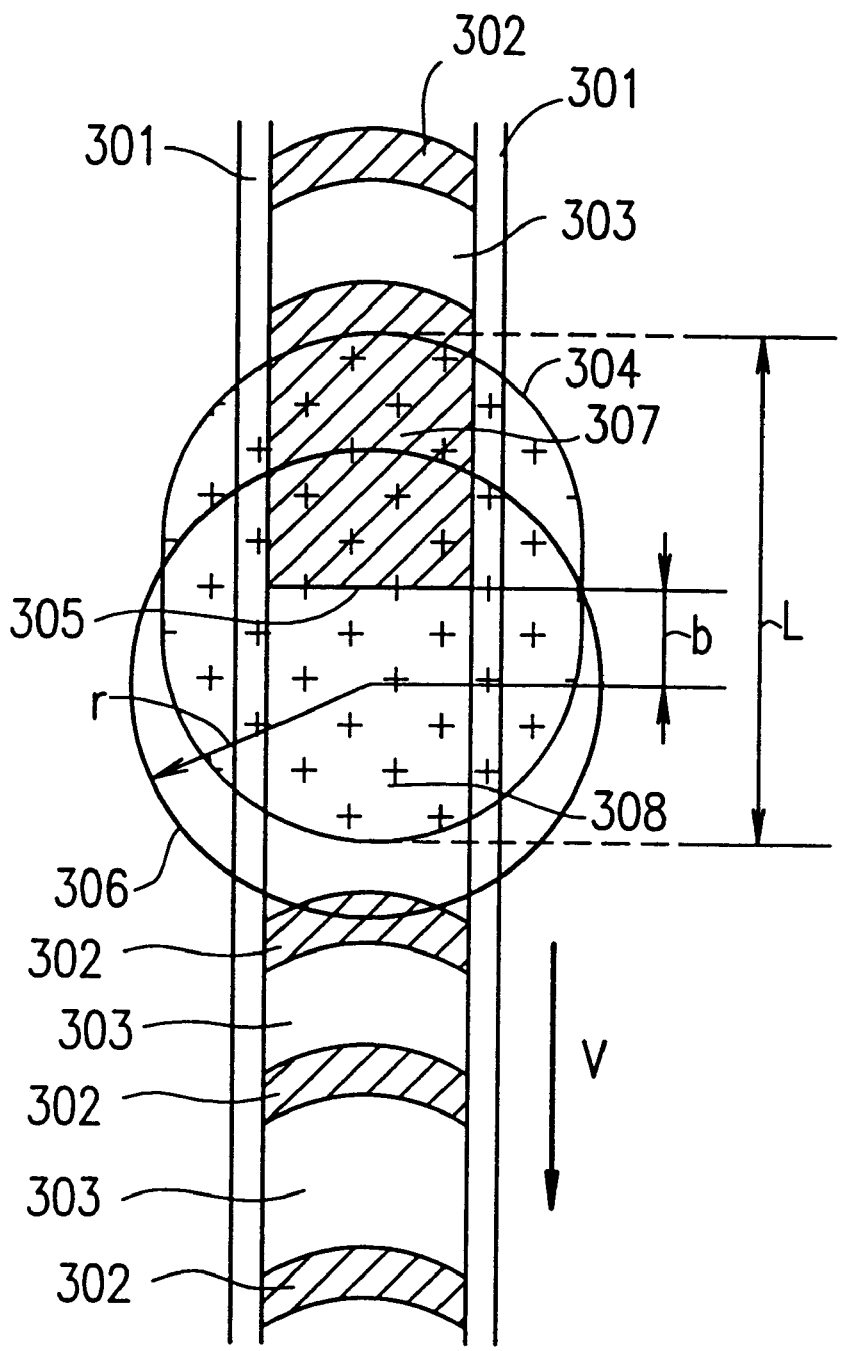
FIG. 3 is a schematic diagram describing the ratio of the area of a magnetic region 308 to that of a magnetic region 307 occupied within the spot created by a light beam 306.

FIG. 3 is a schematic diagram describing the ratio of the area of the magnetic region 308 to that of the magnetic region 307 occupied within the spot created by the light beam 306.

With reference to FIG. 3, it is herein assumed that the light beam 306 has a radius r; the distance from the center of the light beam 306 to the center of the magnetic partition 305 is b; the high temperature region 304 which is heated to the predetermined temperature or above has a length L along the longitudinal direction of the track; and the light beam 305 travels over the optical disk 100 at a relative velocity of v.

The magnetic orientation of the magnetic region 307 appears with a lag time T=L/v from the time at which the magnetic orientation of the magnetic region 308 appears. The ratio of the area of the magnetic region 308 to that of the magnetic region 307 occupied within the spot created by the light beam 306 is about:

$$1+b/r:1-b/r$$

Therefore, an information signal S(t) which is recorded on a track of the optical disk 100 as an information storage medium and a signal R(t) which is reproduced by the irradiation of the light beam 306 satisfy the following relationship:

$$R(t)=S(t)+A \cdot S(t-T) \ldots \qquad \text{eq. 1}$$

where a=(1−b/r)/(1+b/r)

In other words, the reproduced signal R(t) is a sum of the information signal S(t) and the information signal S(t−T), which is delayed from t by time T, multiplied by the constant A.

By resolving eq. 1 with respect to S(t), S(t) can be represented as follows:

$$S(t)=R(t)/\{1+A \cdot \text{Exp}(-j\omega T)\} \ldots \qquad \text{eq. 2}$$

Therefore, in order to restore the signal S(t) (which represents the information actually stored in the track) from the signal R(t) reproduced by the irradiation of the light beam 306, it is necessary to pass the signal R(t) through a filter having the following transfer function:

$$G=1/\{1+A \cdot \exp(-j\omega T)\} \ldots \qquad \text{eq. 3}$$

The signal processing circuit 103 shown in FIG. 1 has the filtering characteristics represented by eq. 3.

Hereinafter, the operation of the signal processing circuit 103 in FIG. 1 will be described with reference to FIGS. 4A to 4D.

Figure 4A:
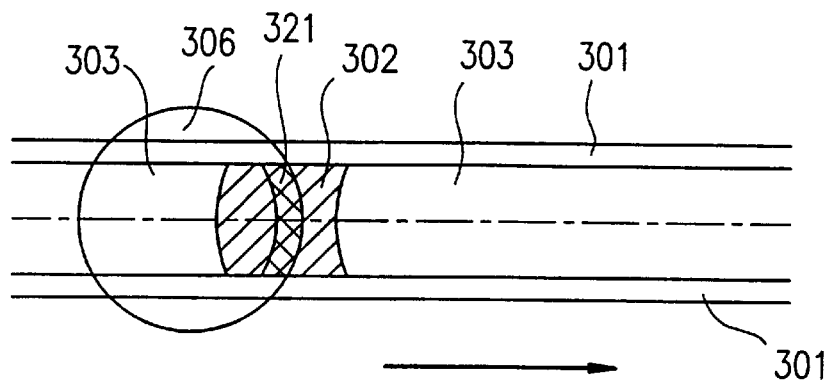
FIG. 4A is a schematic diagram illustrating a track on which one mark (A) 302 is written, as well as a light beam 306.

FIG. 4A is a schematic diagram illustrating a track on which one mark (A) 302 is written as well as a light beam 306. The light beam 306 makes a relative movement along the track in the direction of the arrow.

Figure 4B:
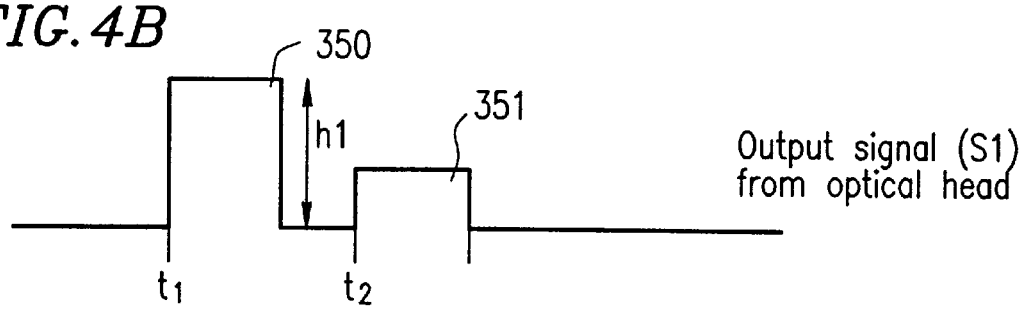
FIG. 4B is a timing diagram showing a reproduction signal S1 generated by a optical head 102 under a magnetic region enlargement reproduction method.
Figure 4C:
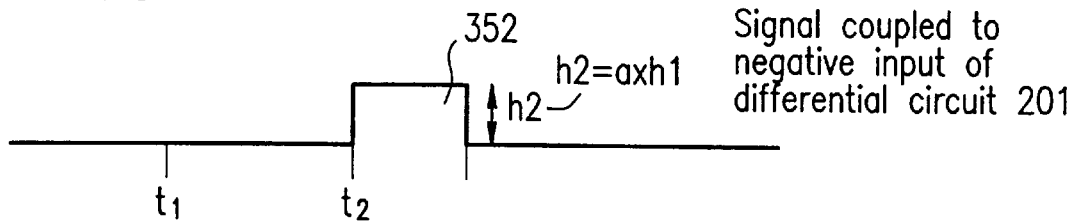
FIG. 4C is a timing diagram showing a signal which is input to a negative input terminal of a differential circuit 201.
Figure 4D:
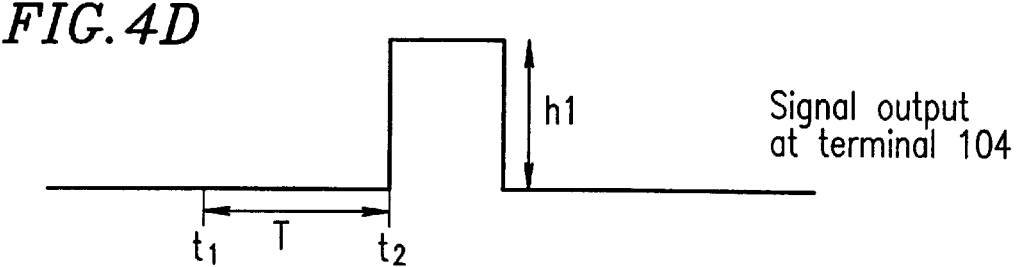
FIG. 4D is a timing diagram showing a reproduction signal S2 output from a terminal 104.

FIG. 4B is a timing diagram showing the reproduction signal S1 generated by the optical head 102 (FIG. 1), which is input to a positive input terminal of the differential circuit 201 (FIG. 1) under the magnetic region enlargement reproduction method. FIG. 4C is a timing diagram showing a signal which is input to a negative input terminal of the differential circuit 201. FIG. 4D is a timing diagram showing the reproduction signal S2, which is output from the terminal 104.

The first pulse 350 results from the shift of a magnetic partition from ahead of the light beam 306, i.e., from a mark near the boundary between the region 304 (which is heated by the light beam 306 to the predetermined temperature or above) and a region located ahead (or in a frontal portion 321) of the light beam 306 that is at a temperature below the predetermined temperature. The subsequent pulse 351 results from the shift of a magnetic partition from behind the light beam 306, i.e., from a mark near the boundary between the region 340 (which is heated by the light beam 306 to the predetermined temperature or above) and a region located behind the light beam 306 that is a temperature below the predetermined temperature.

A signal which is delayed by time T from the time at which the first pulse 350 is input to the differential circuit 201 but retains the same amplitude and pulse width is output to the terminal 104 and also coupled to the amplifier circuit 203 (FIG. 4D). This signal is multiplied by the gain A of the amplifier circuit 203 and input to the negative input terminal of the differential circuit 201 (FIG. 4C) as a pulse 352.

The pulse 352 (which has been multiplied by the gain A of the amplifier circuit 203) and the pulse 351 cancel each other. Thus, the signal which resulted from the shift of the magnetic partition from behind the light beam 306 can be effectively cancelled in the signal processing circuit 103. Although the present example illustrates a case where a single pulse from a single mark is used, the described operation can also be applied to a series of marks having different mark lengths and provide the same effects.

By passage through the above described filter (signal processing circuit 103), the intersymbol interference in the reproduction signal R(t) can be reduced, so that the information which is actually stored in the information storage medium can be reproduced as the signal S(t), thereby realizing information reproduction with a low error rate.

Hereinafter, a specific example of the signal processing circuit 103 will be described with reference to FIGS. 5 to 7.

FIG. 5 is a block diagram illustrating an embodiment of the invention where a CCD variable delay line 221 is employed as a delay circuit in the signal processing circuit 103.

A signal which is input to the CCD variable delay line 221 is retained within the CCD so as to be delayed by a predetermined time T before being output. A variable gain amplifier circuit 222 outputs a signal obtained by multiplying the input signal by A. The delay time T of the CCD variable delay line 221 and the gain A (coefficient) of the variable gain amplifier circuit 222 can be controlled by a control circuit 213.

Figure 6:
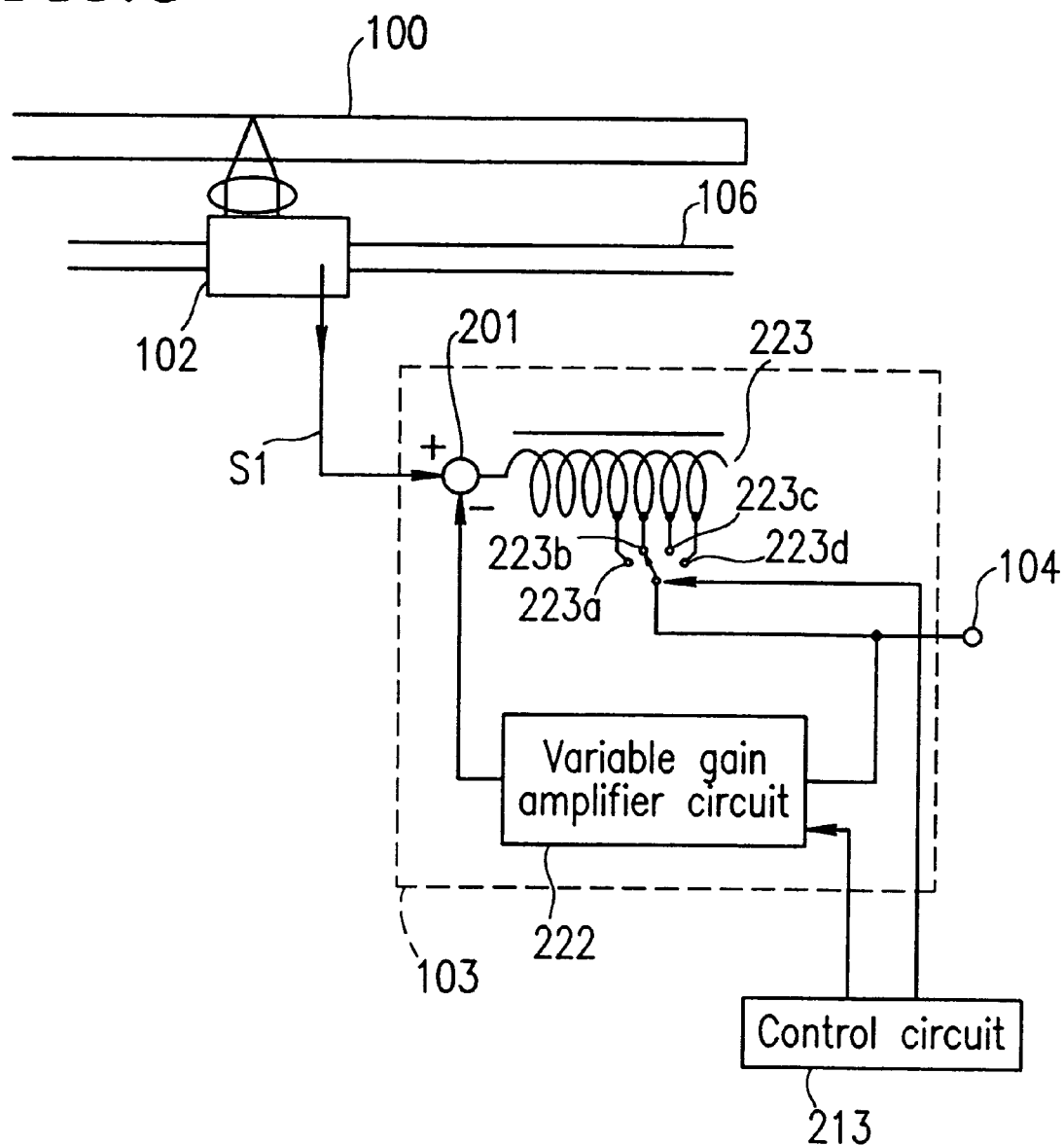
FIG. 6 is a block diagram illustrating an embodiment of the invention where an analog delay line 223 is employed as a delay circuit in the signal processing circuit 103.

FIG. 6 is a block diagram illustrating an embodiment of the invention where an analog delay line 223 is employed as a delay circuit in the signal processing circuit 103.

A signal which is input to the analog delay line 223 is delayed by a predetermined time T before being output. The delay time T can be determined by a control circuit 213 selecting one of taps 223a, 223b, 223c, and 223d provided for the analog delay line 223. The gain A of a variable gain amplifier circuit 222 can be controlled by the control circuit 213.

Figure 7:
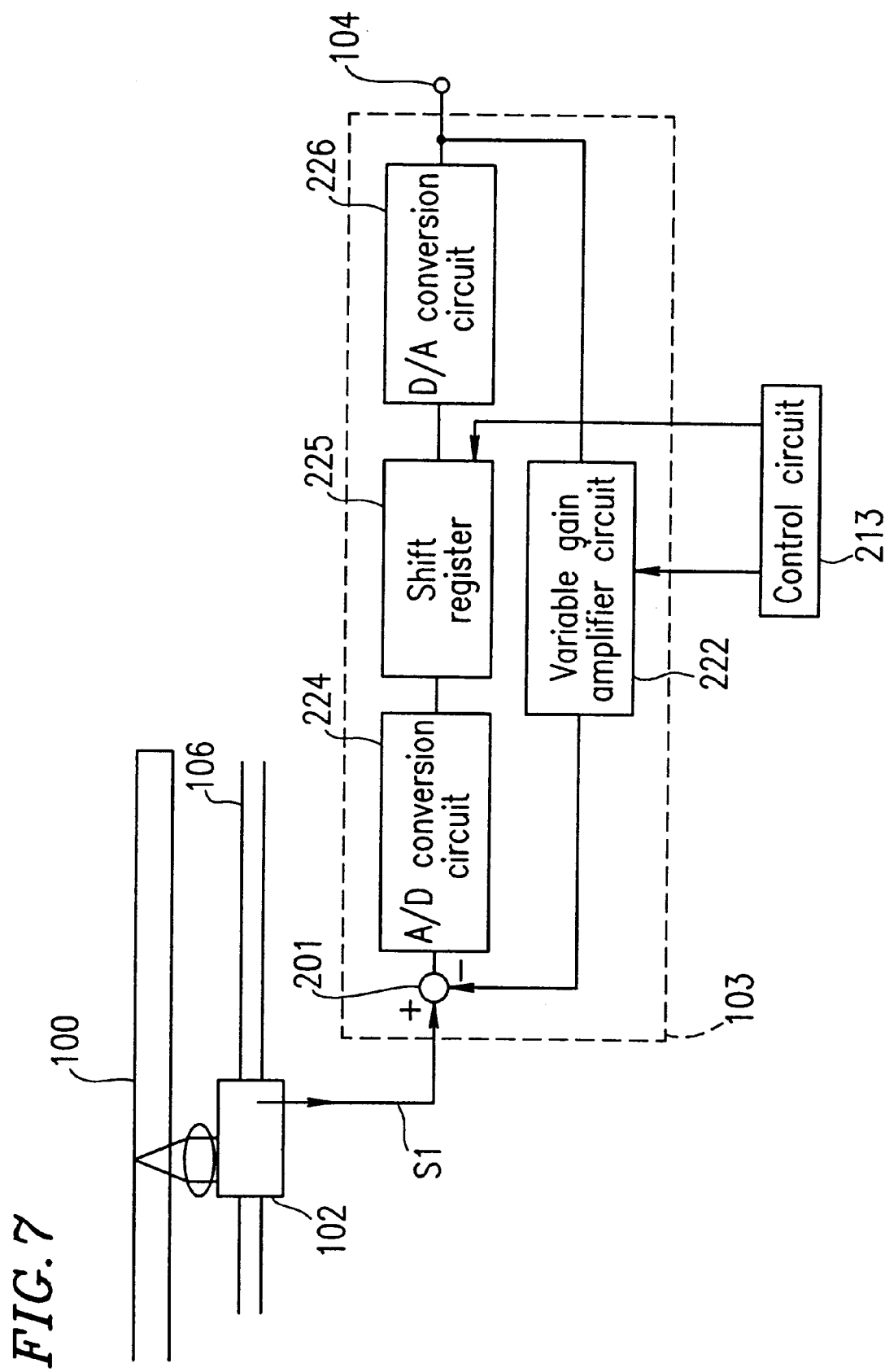
FIG. 7 is a block diagram illustrating an embodiment of the invention where a shift register 225 is employed as a delay circuit in the signal processing circuit 103.

FIG. 7 is a block diagram illustrating an embodiment of the invention where a shift register 225 is employed as a delay circuit in the signal processing circuit 103.

The reproduction signal S1 is converted into a digital signal by an A/D conversion circuit 224. A signal output from the A/D conversion circuit 224 is retained in a shift register 225 and, after the lapse of a predetermined time T, output from the shift register 225. A D/A conversion circuit 226 receives a digital output signal from the shift register 225, converts the digital signal into an analog signal, and outputs the resultant analog signal. The delay time T is variable in accordance with the number of stages within the shift register 225. The delay time T of the number of stages within the shift register 225 and the gain A of a variable gain amplifier circuit 222 can be controlled by the control circuit 213.

Instead of the three embodiments exemplified above, the signal processing circuit 103 can have any configuration which is capable of delaying input signals. For example, a signal can be delayed during propagation through a coaxial cable, an optical fiber, or a transistor or like elements.

(Example 2)

Hereinafter, a circuit for optimizing the delay time T of the aforementioned delay circuit 202 and the gain A of the aforementioned amplifier circuit 203 will be described with reference to FIG. 8.

Figure 8:
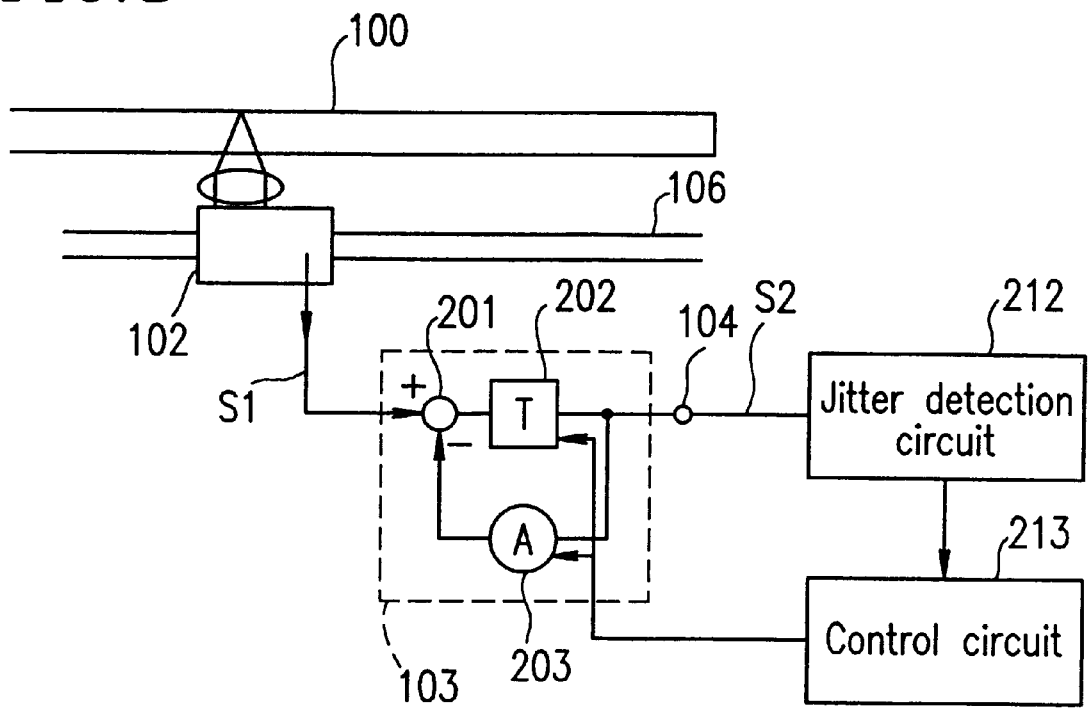
FIG. 8 is a block diagram illustrating an optical information processing apparatus 20 according to Example 2 of the present invention.

FIG. 8 is a block diagram illustrating an optical information processing apparatus 20 according to Example 2 of the present invention. The optical information processing apparatus 20 includes an optical head 102, a transportation member 106, a signal processing circuit 103, a jitter detection circuit 212, and a control circuit 213.

The control circuit 213 optimizes the signal processing circuit 103 so as to minimize the jitter value of the reproduction signal S2 output from the signal processing circuit 103. Specifically, the control circuit 213 optimizes the delay time T and the gain A so as to minimize the jitter value of the reproduction signal S2.

The jitter detection circuit 212 receives the reproduction signal S2 which is output from a terminal 104 of the signal processing circuit 103 and calculates the jitter thereof. The control circuit 213 controls the delay time T of the delay circuit 202 and the gain A of the amplifier circuit 203 based on an output signal from the jitter detection circuit 212 representing the calculated jitter value.

The control circuit 213 optimizes the delay time T of the delay circuit 202 and the gain A of the amplifier circuit 203 by slightly changing the delay time T and the gain A and comparing the jitter values detected before and after the slight change until arriving at the smallest possible jitter value.

Hereinafter, an example of the jitter detection circuit 212 will be described with reference to FIGS. 9 to 12.

Figure 9:
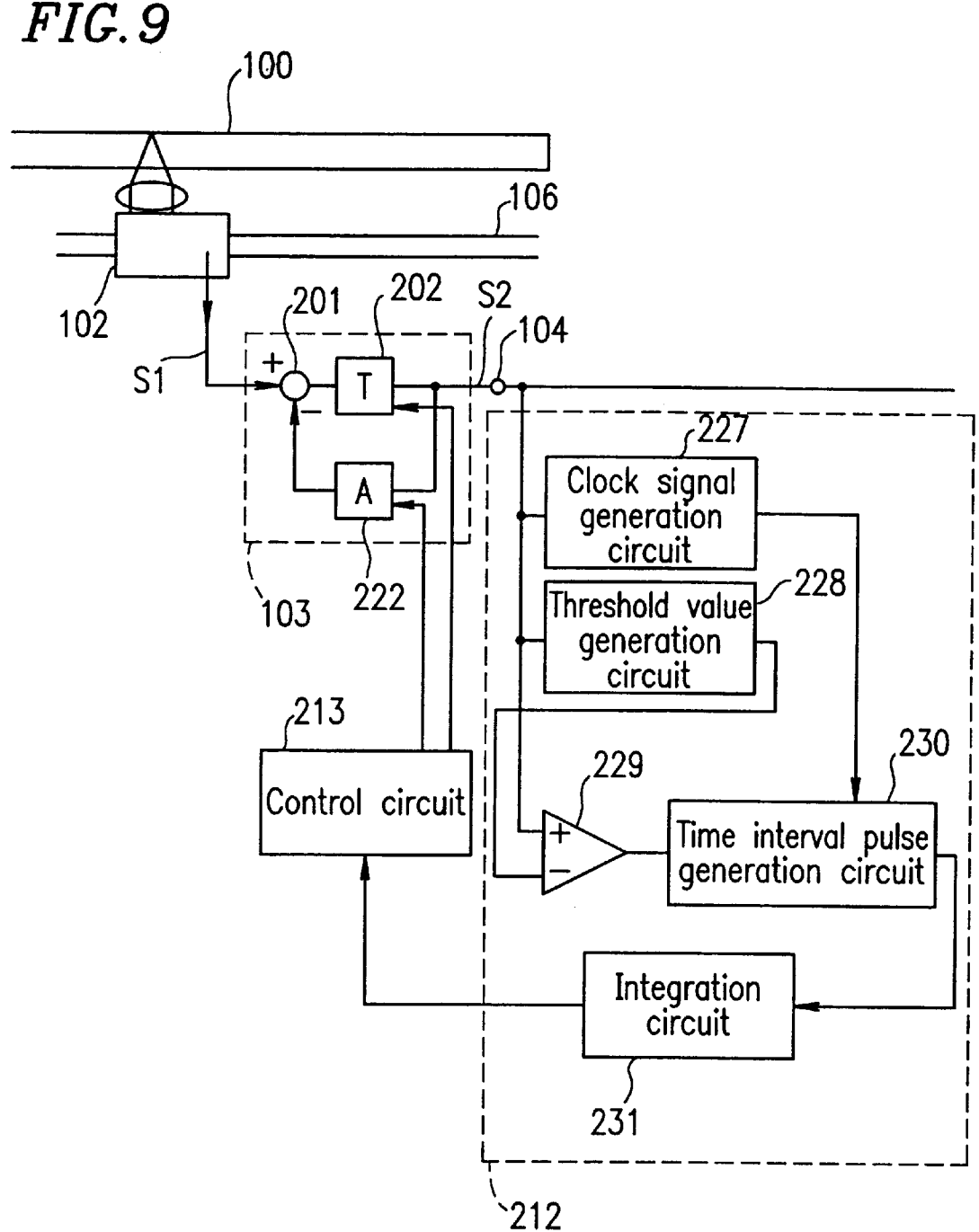
FIG. 9 is a block diagram illustrating the detailed structure of the jitter detection circuit 212.
Figure 10:
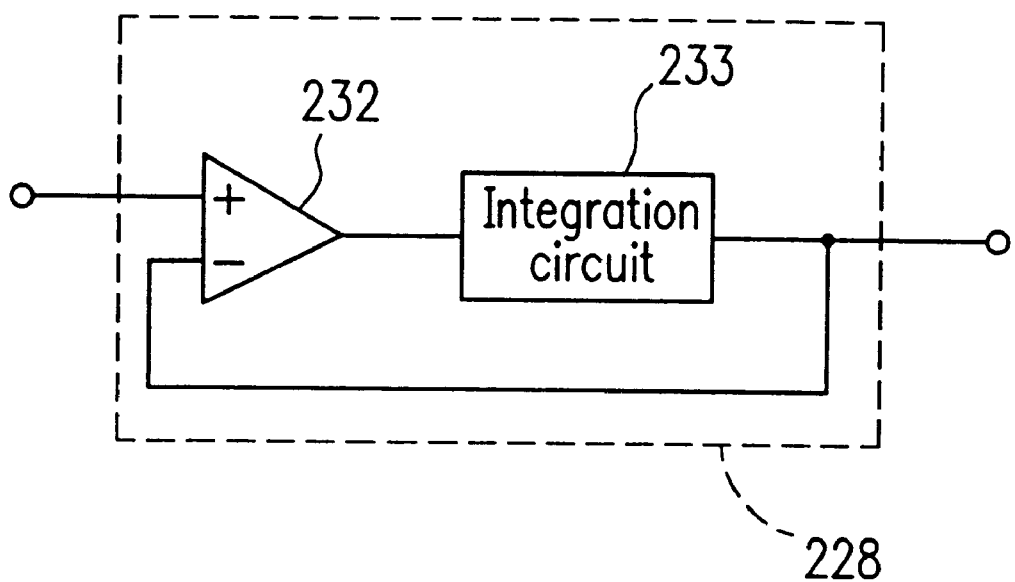
FIG. 10 is a circuit diagram showing an exemplary structure of a threshold value generation circuit 228.
Figure 11:
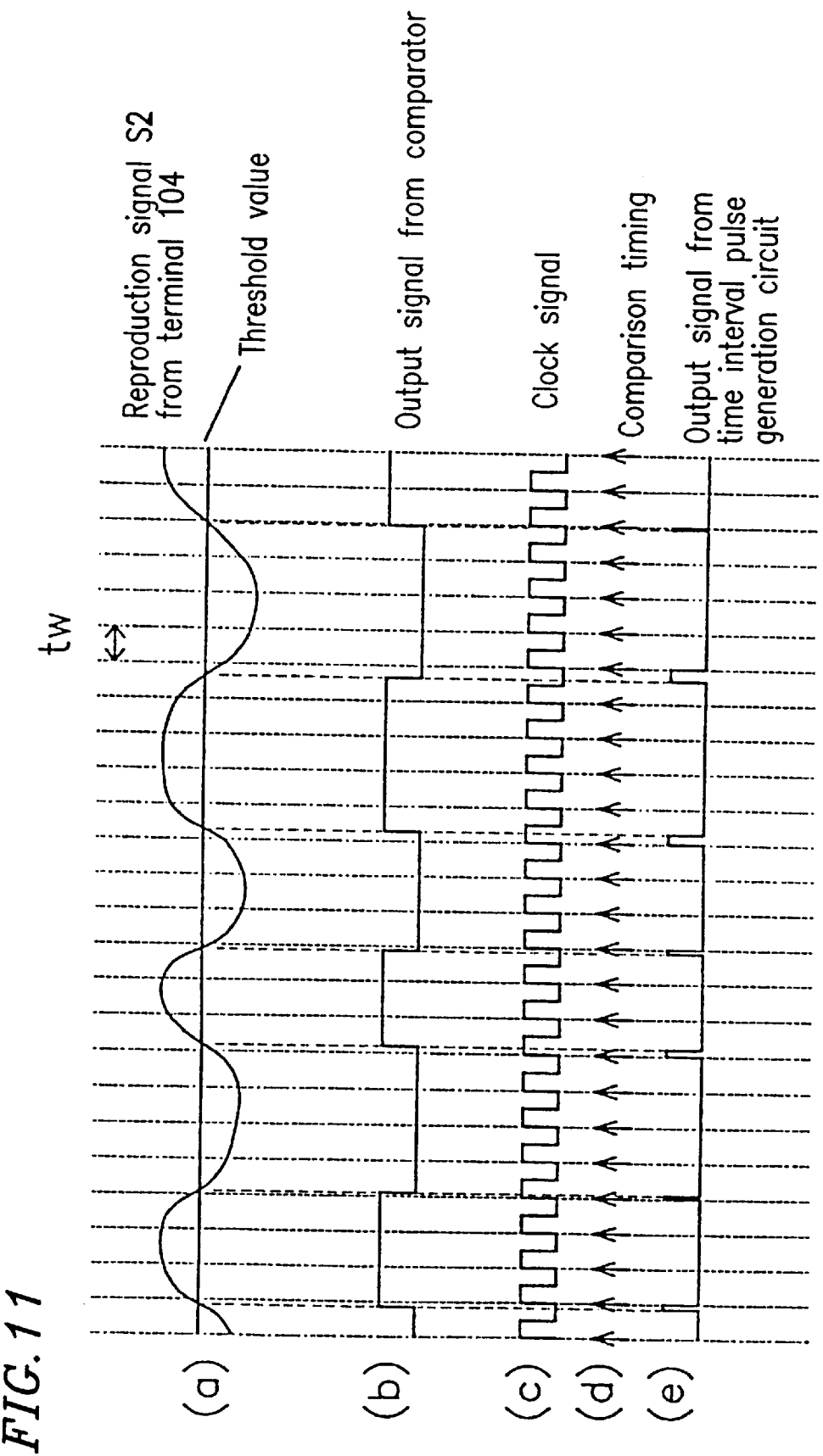
FIG. 11 is a waveform diagram illustrating the waveforms at various points of the jitter detection circuit 212.

FIG. 9 is a block diagram illustrating the detailed structure of the jitter detection circuit 212. FIG. 10 is a circuit diagram showing an exemplary structure of a threshold value generation circuit 228 shown in FIG. 9. FIG. 11 is a waveform diagram illustrating the waveforms at various points of the jitter detection circuit 212.

The jitter detection circuit 212 includes a clock signal generation circuit 227, a threshold value generation circuit 228, a comparator 229, a time interval pulse generation circuit 230, and an integration circuit 231.

The clock signal generation circuit 227 receives the reproduction signal S2 (shown as waveform (a) in FIG. 11) to generate a clock signal by means of a PLL circuit or the like. The clock signal is a signal which undergoes periodic changes at a basic cycle tw which is determined based on the fundamental minimum unit length of the information stored on a disk 100 and the relative velocity of a light beam with respect to the disk 100.

The waveform (c) shown in FIG. 11 represents the waveform of the clock signal generated by the clock signal generation circuit 227. The clock signal is generated in such a manner that the points in time at which the light beam passes ends of information regions (marks) on the disk 100 on average coincide with the rising edges of the clock signal.

The threshold value generation circuit 228 receives the reproduction signal S2 output from the terminal 104 and generates a threshold value based on the reproduction signal S2. As shown in FIG. 10, the threshold value generation circuit 228 includes a comparator 232 and an integration circuit 233.

The threshold value generation circuit 228 receives the reproduction signal S2 at a positive input terminal of the comparator 232.

A comparison signal representing a result of the comparison performed at the comparator 232 is input to the integration circuit 233, which integrates the comparator signal over a predetermined period of time. An integration signal representing a result of the integration performed at the integration circuit 233 is output as the output signal of the threshold value generation circuit 228, and also coupled to a negative input terminal of the comparator 232.

If the integration signal is lower than the threshold value of the reproduction signal S2, the comparison signal output from the comparator 232 will take a plus value, thereby increasing the value of the integration signal. Eventually, the integration signal from the integration circuit 233 will equal the threshold level for the reproduction signal S2. If the integration signal is larger than the threshold value of the reproduction signal S2, the integration signal from the integration circuit 233 will decrease through an opposite operation until it equals the threshold level for the reproduction signal S2.

The comparator 229 shown in FIG. 9 receives the reproduction signal S2 from the terminal 104 and the output signal from the threshold value generation circuit 228 and outputs a comparison signal representing a result of the comparison therebetween.

The waveform (a) shown in FIG. 11 represents the waveform of the reproduction signal S2 output from the terminal 104 against the output signal (threshold value) from the threshold value generation circuit 228. The waveform (b) shown in FIG. 11 represents the waveform of the comparison signal output from the comparator 229.

The time interval pulse generation circuit 230 receives the clock signal output from the clock signal generation circuit 227 and the comparison signal output from the comparator 229 so as to output pulses each representing a lag between a rising edge of the clock signal and a rising or falling edge of the comparison signal. The waveform (d) shown in FIG. 11 represents the waveform of a timing signal for performing comparison. The waveform (e) shown in FIG. 11 represents the waveform of the output signal from the time interval pulse generation circuit 230.

The integration circuit 231 shown in FIG. 9 receives the output signal output from the time interval pulse generation circuit 230, and integrates the signal over a predetermined period of time. An integration signal representing a result of the integration performed at the integration circuit 231 represents the jitter value of the reproduction signal S2.

Figure 12:
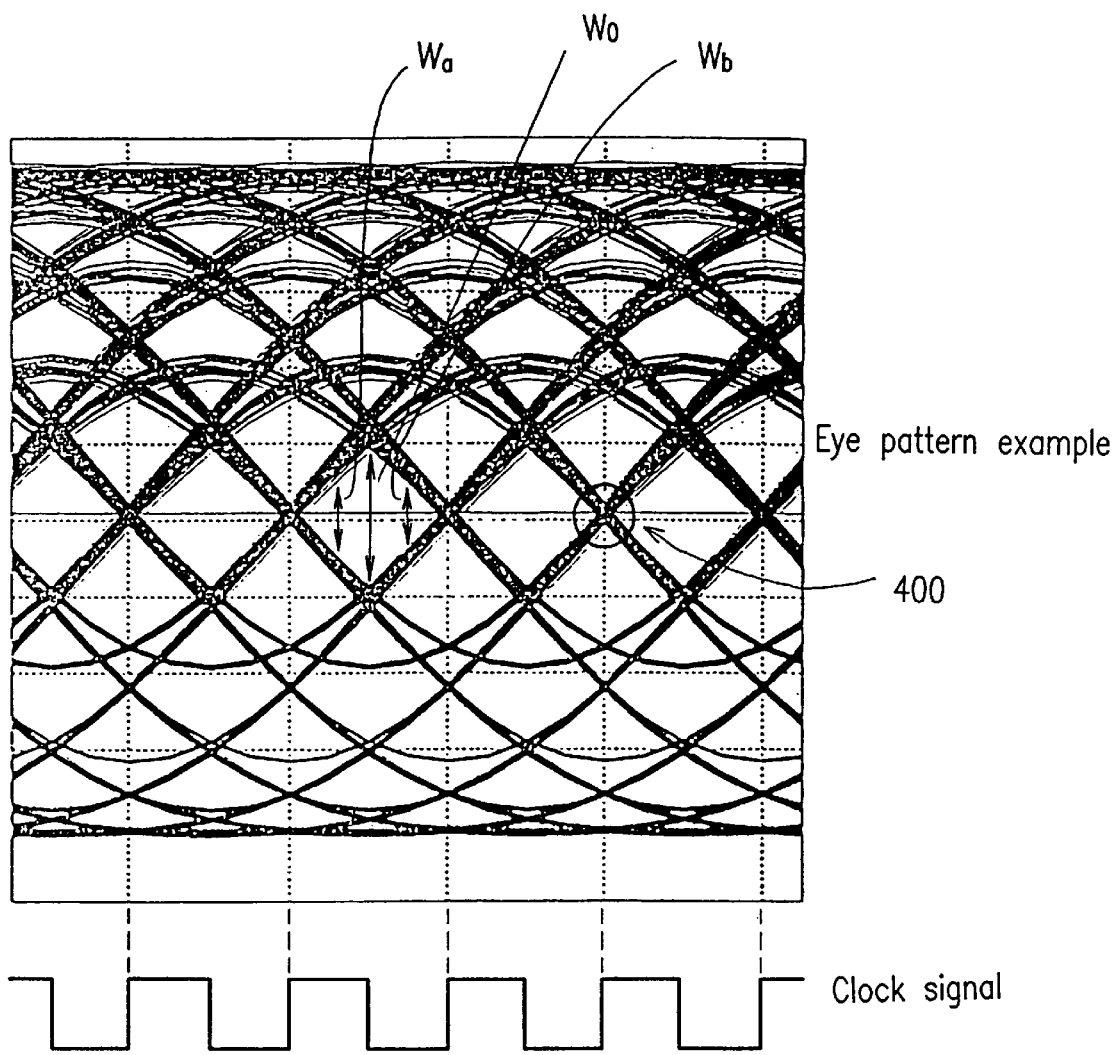
FIG. 12 is a graph showing an exemplary eye pattern of the reproduction signal S2.

FIG. 12 is a graph showing an exemplary eye pattern of the reproduction signal S2.

As used herein, an eye pattern is defined as a signal waveform obtained by overlaying the reproduction signal S2 upon itself by using a certain threshold value as a trigger level. The lateral spread of a portion 400 (i.e., an intersection of the signals) of the eye pattern shown in FIG. 12 corresponds to the jitter value.

The jitter value increases as the reproduction signal S2 output from the terminal 104 intersects the threshold level with more fluctuated timing relative to the timing of the rising edges of the clock signal.

The jitter value should be minimized because the error rate during information reproduction may increase as the jitter value increases. The control circuit 213 shown in FIGS. 8 and 9 receives the signal output from the integration circuit 231 representing the jitter value, and determines the delay time T of the delay circuit 202 and the gain A of the variable gain amplifier circuit 222 so as to minimize the jitter value.

Figure 13:
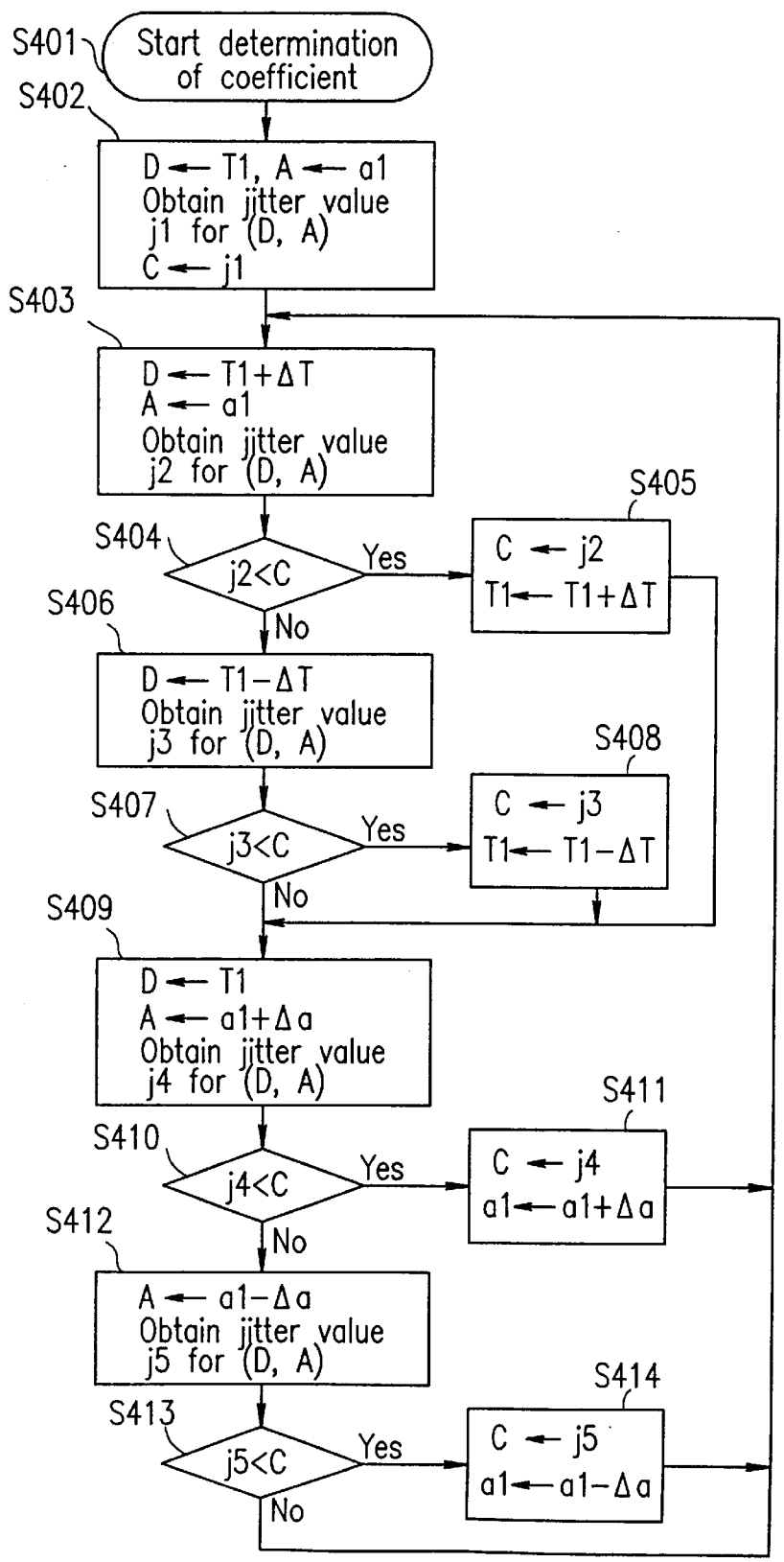
FIG. 13 is a flow chart illustrating a flow of control of the control circuit 213 for determining the gain of the delay time T of a delay circuit 202 and the gain A of a variable gain amplifier circuit 222 so as to minimize the jitter value.

FIG. 13 is a flow chart illustrating a flow of control of the control circuit 213 for determining the gain of the delay time T of the delay circuit 202 and the gain A of the variable gain amplifier circuit 222 so as to minimize the jitter value.

At step S402, the control circuit 213 sets a value T1 (as an initial value) to a delay time D and sets a value a1 (as an initial value) to a gain A. The control circuit 213 receives the jitter value j1 for the delay time D and the gain A and sets j1 to a comparison value C. At step S403, the control circuit 213 sets a value T1+ΔT to the delay time D, sets the value a1 to the gain A, and receives the jitter value j2 for the delay time D and the gain A.

At step S404, the control circuit 213 compares the comparison value C and the jitter value j2. If the jitter value j2 is smaller than the comparison value C (step S405), the control circuit 213 sets the jitter value j2 to the comparison value C, and increments the value T1 by ΔT. The control proceeds to step S409 (described later).

If the jitter value j2 is not smaller than the comparison value C (step S406), the control circuit 213 sets a value T1−ΔT to the delay time D, and receives a jitter value j3 for the delay time D and the gain A.

At step S407, the control circuit 213 compares the comparison value C and the jitter value j3. If the jitter value j3 is smaller than the comparison value C (step S408), the control circuit 213 sets the jitter value j3 to the comparison value C, and decrements the value T1 by ΔT. The control proceeds to step S409.

For example, if the jitter value j3 is not smaller than the comparison value C, the control proceeds to step S409 and the control circuit 213 sets the value T1 to the delay time D, set a value a1+Δa to the gain A, and receives a jitter value j4 for the delay time D and the gain A.

At step S410, the control circuit 213 compares the comparison value C and the jitter value j4. If the jitter value j4 is smaller than the comparison value C (step S411), the control circuit 213 sets the jitter value j4 to the comparison value C, and increments the value a1 by Δa. Thereafter the control proceeds to step S403.

If the jitter value j4 is not smaller than the comparison value C (step S412), the control circuit 213 sets a value a1−Δa to the gain A, and receives a jitter value j5 for the delay time D and the gain A.

At step S413, the control circuit 213 compares the comparison value C and the jitter value j5. If the jitter value j5 is smaller than the comparison value C (step S414), the control circuit 213 sets the jitter value j5 to the comparison value C, and decrements the value a1 by Δa. Thereafter the control proceeds to step S403. If the jitter value j5 is not smaller than the comparison value C, the control proceeds to step S403.

Thus, the control repeats the above steps until there is substantially no fluctuation in the delay time and the gain.

By using this technique, it becomes unnecessary to previously store a detection pattern or the like in the information storage medium (e.g., a disk) for optimizing the delay time T and the gain A, thereby making it possible to efficiently utilize the capacity of the information storage medium. This technique also provides optimization of the delay time T and the gain A whenever it is required because it is free from any restraints associated with a particular positioning of a detection pattern.

(Example 3)

Hereinafter, another circuit for optimizing the delay time T of the aforementioned delay circuit 202 and the gain A of the aforementioned amplifier circuit 203 will be described with reference to FIG. 14.

Figure 14:
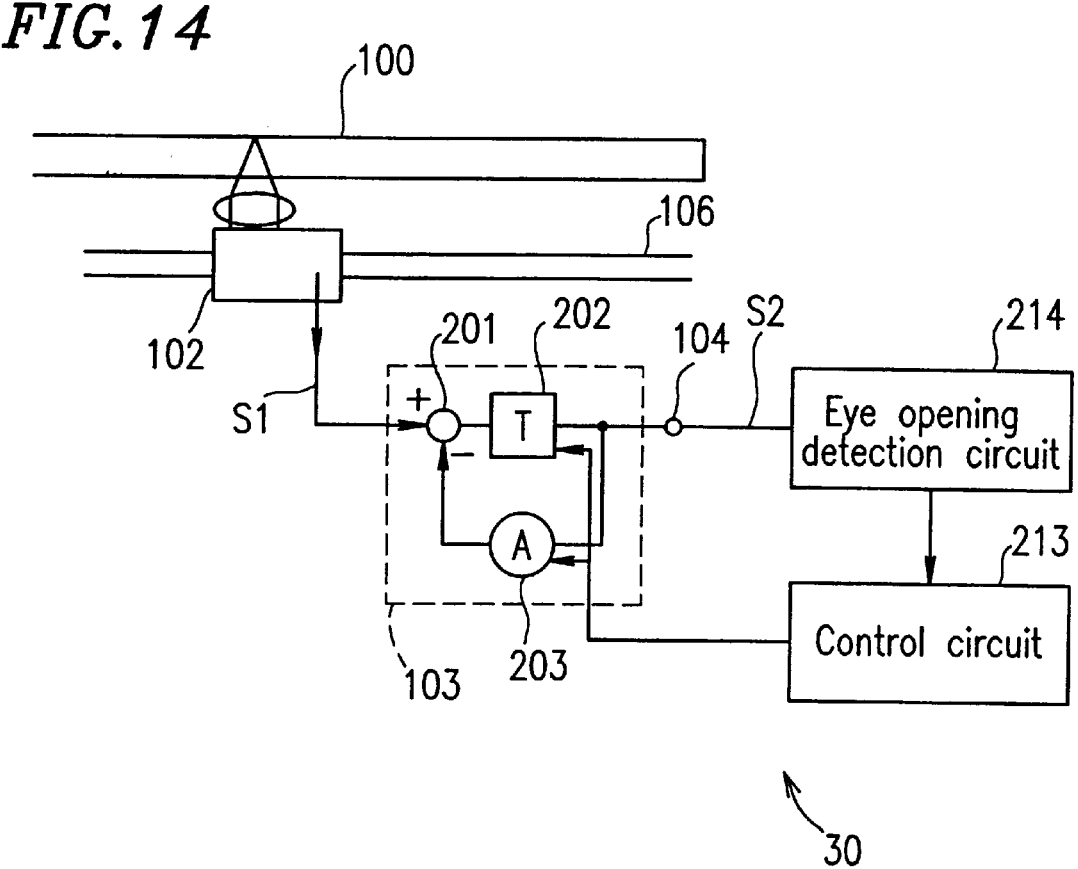
FIG. 14 is a block diagram illustrating an optical information processing apparatus 30 according to Example 3 of the present invention.

FIG. 14 is a block diagram illustrating an optical information processing apparatus 30 according to Example 3 of the present invention. The optical information processing apparatus 30 optimizes the signal processing circuit 103 so as to maximize the opening of the eye pattern of the reproduction signal S2 output from the signal processing circuit 103. Specifically, the optical information processing apparatus 30 optimizes the delay time T and the gain A so as to maximize the opening of the eye pattern of the reproduction signal S2.

The optical information processing apparatus 30 includes an optical head 102, a transportation member 106, a signal processing circuit 103, a control circuit 213, and an eye opening detection circuit 214.

The eye opening detection circuit 214 receives the reproduction signal S2 which is output from a terminal 104 of the signal processing circuit 103 and calculates the eye pattern opening thereof. The control circuit 213 controls the delay time T of the delay circuit 202 and the gain A of the amplifier circuit 203 based on an output signal from the eye opening detection circuit 214 representing the calculated eye opening value. The control circuit 213 optimizes the delay time T of the delay circuit 202 and the gain A of the amplifier circuit 203 by slightly changing the delay time T and the gain A and comparing the eye opening values detected before and after the slight change until arriving at the largest eye opening value.

An eye opening value can be calculated by generating a clock by means of a PLL circuit and the like, holding the values of an input signal which is ½ clock shifted from clock edges, and deriving a difference between the minimum value among those which are larger than a certain threshold value and the maximum value among those which are smaller than the threshold value.

Hereinafter, an exemplary configuration of the eye opening detection circuit will be described in detail with reference to FIGS. 15 to 19.

Figure 15:
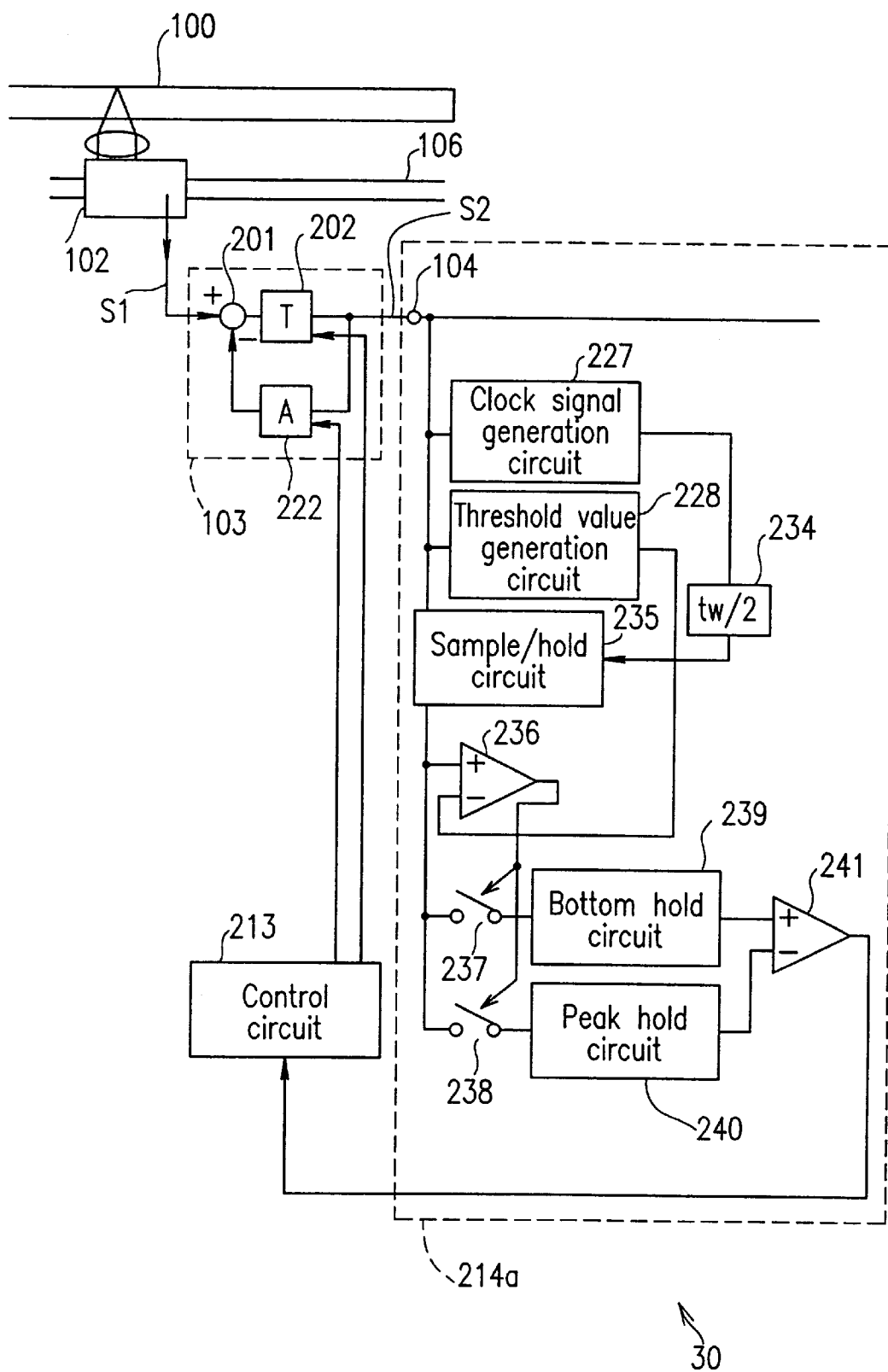
Figure 16:
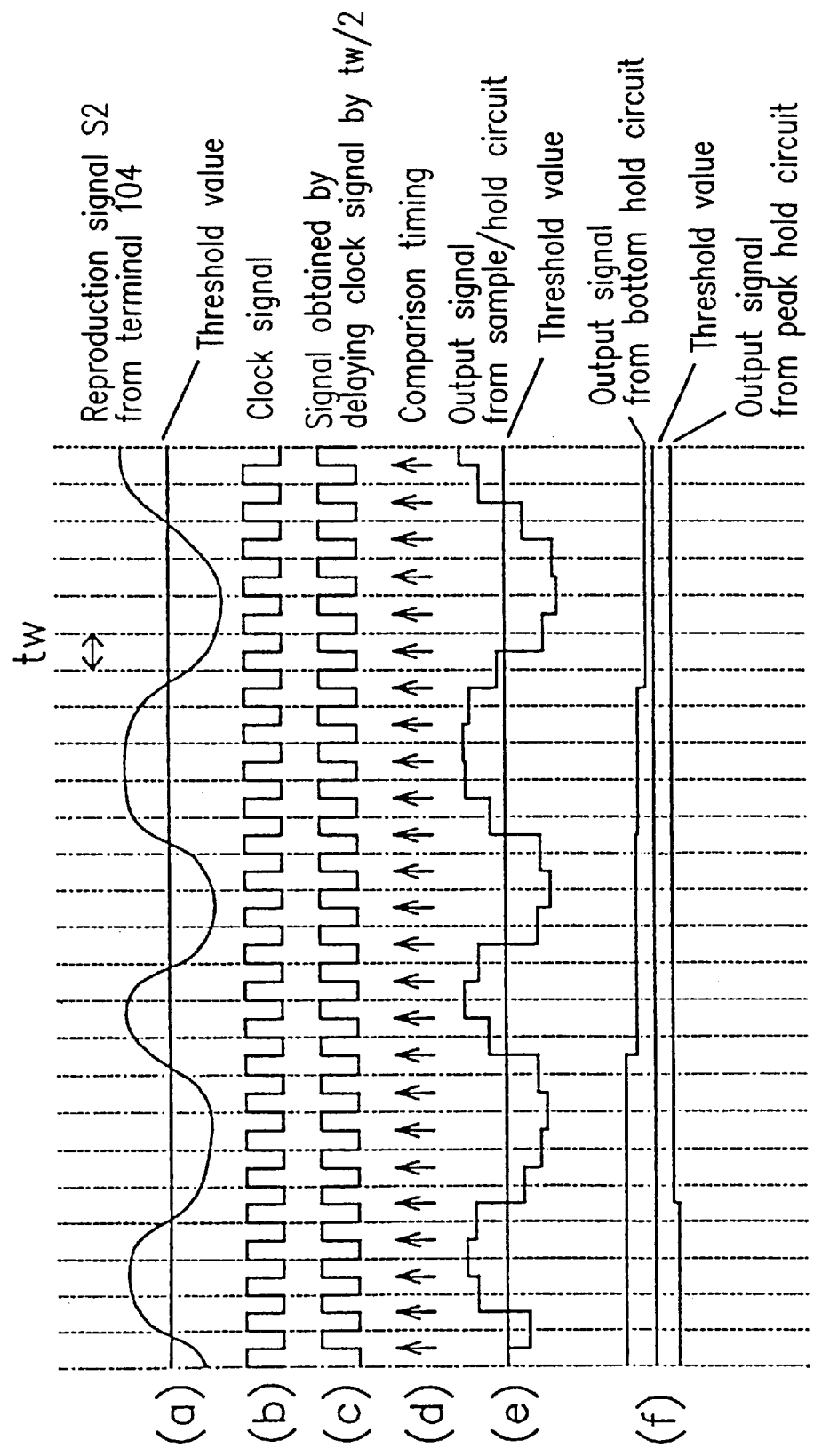

FIG. 15 is a block diagram illustrating the structure of the eye opening detection circuit 214a. FIG. 16 is a waveform diagram illustrating the waveforms at various points of the eye opening detection circuit 214a.

The eye opening detection circuit 214a optimizes the delay time and the gain so as to maximize the opening of the eye pattern of the reproduction signal S2 output from the signal processing circuit 103.

The eye opening detection circuit 214a includes a clock signal generation circuit 227, a threshold value generation circuit 228, a delay circuit 234, a sample/hold circuit 235, a comparator 236, a switch 237, a switch 238, a bottom hold circuit 239, a peak hold circuit 240, and a comparator 241.

The clock signal generation circuit 227 receives the reproduction signal S2 from the terminal 104 to generate a clock signal by means of a PLL circuit or the like. The waveform (b) shown in FIG. 16 represents the waveform of the clock signal.

The threshold value generation circuit 228 receives the reproduction signal S2 output from the terminal 104 and generates a threshold value.

The delay circuit 234 receives the clock signal and outputs a signal which is delayed by ½ of the cycle tw of the clock signal. The waveform (c) shown in FIG. 16 represents the waveform of the signal which is delayed by ½ of the cycle tw of the clock signal.

The sample/hold circuit 235 receives the reproduction signal S2 from terminal 104, and holds the reproduction signal S2 at rising edges of a timing signal from the delay circuit 234. The waveform (d) shown in FIG. 16 represents rising edges of the timing signal from the delay circuit 234. The waveform (e) shown in FIG. 16 represents the waveform obtained by holding the reproduction signal S2 at the rising edges of the timing signal shown as (d) of FIG. 16.

The comparator 236 receives the output signal from the sample/hold circuit 235 and the output signal from the threshold value generation circuit 228, and outputs a comparison signal representing a result of the comparison therebetween. The output signal from the sample/hold circuit 235 is input the bottom circuit 239 via the switch 237. The switch 237 is opened or closed in accordance with the output signal from the comparator 236. Specifically, the switch 237 is closed when the output signal from the sample/hold circuit 235 is larger than the threshold value so that the output signal from the sample/hold circuit 235 is input to the bottom hold circuit 239.

The output signal from the sample/hold circuit 235 is also input to the peak hold circuit 240 via the switch 238. The switch 238 is opened or closed in accordance with the output signal from the comparator 236. Specifically, the switch 238 is closed when the output signal from the sample/hold circuit 235 is larger than the threshold value so that the output signal from the sample/hold circuit 235 is input to the peak hold circuit 240.

The bottom hold circuit 239 holds the minimum value (bottom value) of the input signal. The peak hold circuit 240 holds the maximum value (peak value) of the input signal (waveform (f) shown in FIG. 16). The differential circuit 241 derives a difference between the output signal from the bottom hold circuit 239 and the output signal from the peak hold circuit 240.

The signal output from the differential circuit 241 represents the eye opening of the reproduction signal S2. The eye opening is, with respect to the values of the reproduction signal S2 from the terminal 104 which is tw/2 shifted from the rising edges of the clock signal, the difference between the minimum value among those which are larger than the threshold value and the maximum value among those which are smaller than the threshold value. In the eye pattern shown in FIG. 12, the width $W_o$ represents the eye opening.

The eye opening value should be maximized because the error rate during information reproduction may increase as the eye opening value decreases. The control circuit 213 receives the signal output from the differential circuit 241 representing the eye opening value, and determines the delay time T of the delay circuit 202 and the gain A of the variable gain amplifier circuit 222 so as to maximize the eye opening value.

Figure 17:
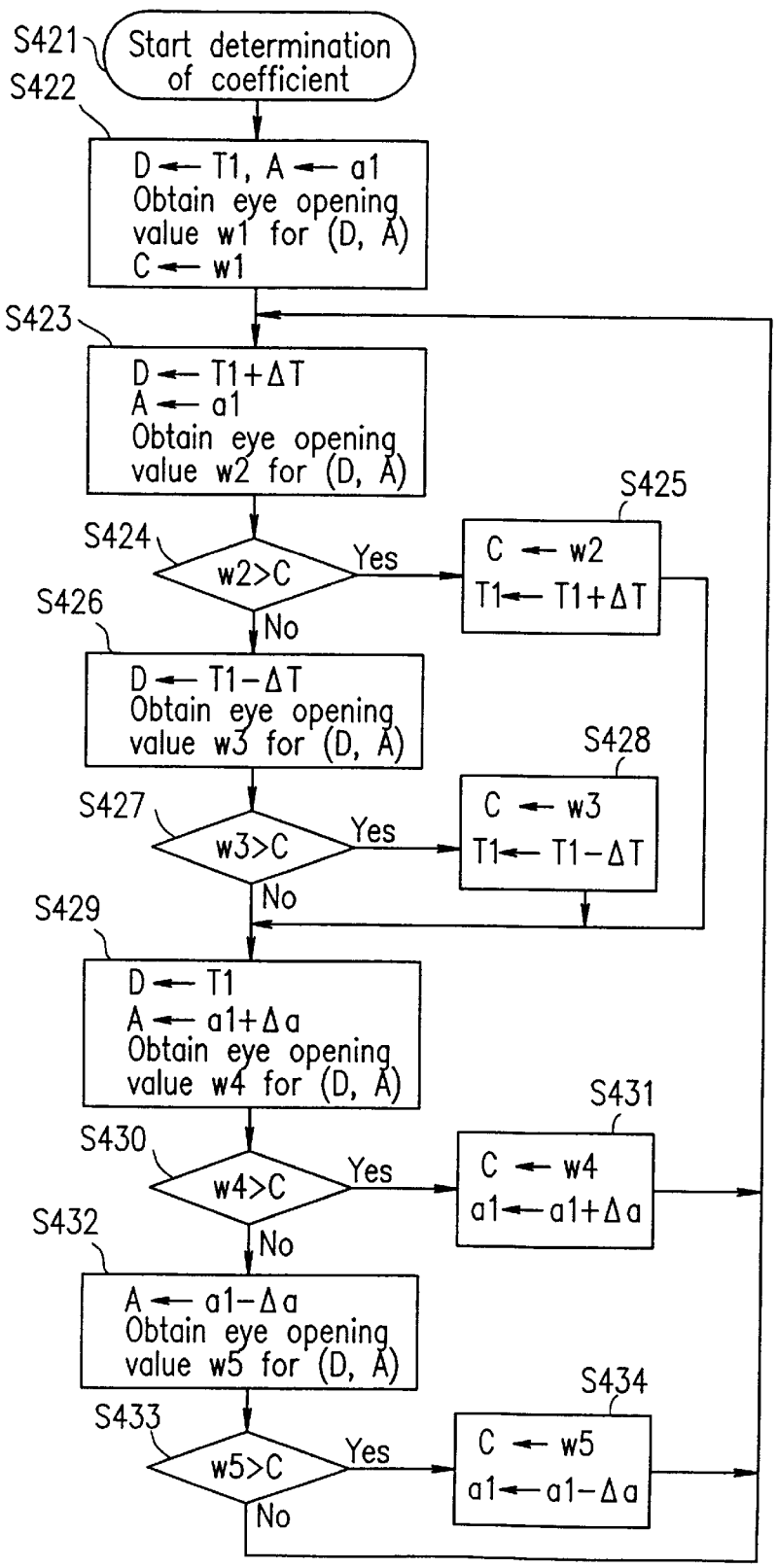
FIG. 17 is a flow chart illustrating a flow of control of the control circuit 213 for determining the gain of the delay time T of a delay circuit 202 and the gain A of a variable gain amplifier circuit 222 so as to maximize the eye opening value.

FIG. 17 is a flow chart illustrating a flow of control of the control circuit 213 for determining the gain of the delay time T of the delay circuit 202 and the gain A of the variable gain amplifier circuit 222 so as to maximize the eye opening value.

At step S422, the control circuit 213 sets a value T1 (as an initial value) to a delay time D and sets a value a1 (as an initial value) to a gain A. The control circuit 213 receives the eye opening value w1 for the delay time D and the gain A and sets w1 to a comparison value C. At step S423, the control circuit 213 sets a value T1+ΔT to the delay time D, sets the value a1 to the gain A, and receives the eye opening value w2 for the delay time D and the gain A.

At step S424, the control circuit 213 compares the comparison value C and the eye opening value w2. If the eye opening value w2 is larger than the comparison value C (step S425), the control circuit 213 sets the eye opening value w2 to the comparison value C, and increments the value T1 by ΔT. The control proceeds to step S429 (described later).

If the eye opening value w2 is not larger than the comparison value C (step S426), the control circuit 213 sets a value T1−ΔT to the delay time D, and receives an eye opening value w3 for the delay time D and the gain A.

At step S427, the control circuit 213 compares the comparison value C and the eye opening value w3. If the eye opening value w3 is larger than the comparison value C (step S428), the control circuit 213 sets the eye opening value w3 to the comparison value C, and decrements the value T1 by ΔT. The control proceeds to step S429.

For example, if the eye opening value w3 is not larger than the comparison value C, the control proceeds to step S429 and the control circuit 213 sets the value T1 to the delay time D, sets a value a1+Δa to the gain A, and receives an eye opening value w4 for the delay time D and the gain A.

At step S430, the control circuit 213 compares the comparison value C and the eye opening value w4. If the eye opening value w4 is larger than the comparison value C (step S431), the control circuit 213 sets the eye opening value w4 to the comparison value C, and increments the value a1 by Δa. Thereafter the control proceeds to step S423.

If the eye opening value w4 is not larger than the comparison value C (step S432), the control circuit 213 sets a value a1−Δa to the gain A, and receives an eye opening value w5 for the delay time D and the gain A.

At step S433, the control circuit 213 compares the comparison value C and the eye opening value w5. If the eye opening value w5 is larger than the comparison value C (step S434), the control circuit 213 sets the eye opening value w5 to the comparison value C, and decrements the value a1 by Δa. Thereafter the control proceeds to step S423. If the eye opening value w5 is not larger than the comparison value C, the control proceeds to step S423.

Thus, the control repeats the above steps until there is substantially no fluctuation in the delay time and the gain.

By using this technique, as in the earlier embodiment of determining the delay time T and the gain A based on jitter values, it becomes unnecessary to previously store a detection pattern or the like in the information storage medium (e.g., a disk) for optimizing the delay time T and the gain A, thereby making it possible to efficiently utilize the capacity of the information storage medium. This technique also provides optimization of the delay time T and the gain A whenever it is required because it is free from any restraints associated with a particular positioning of a detection pattern.

Hereinafter, yet another circuit for optimizing the delay time T of the delay circuit 202 and the gain A of the amplifier circuit 203 in the signal processing circuit 103 will be described with reference to FIGS. 18 and 19.

Figure 18:
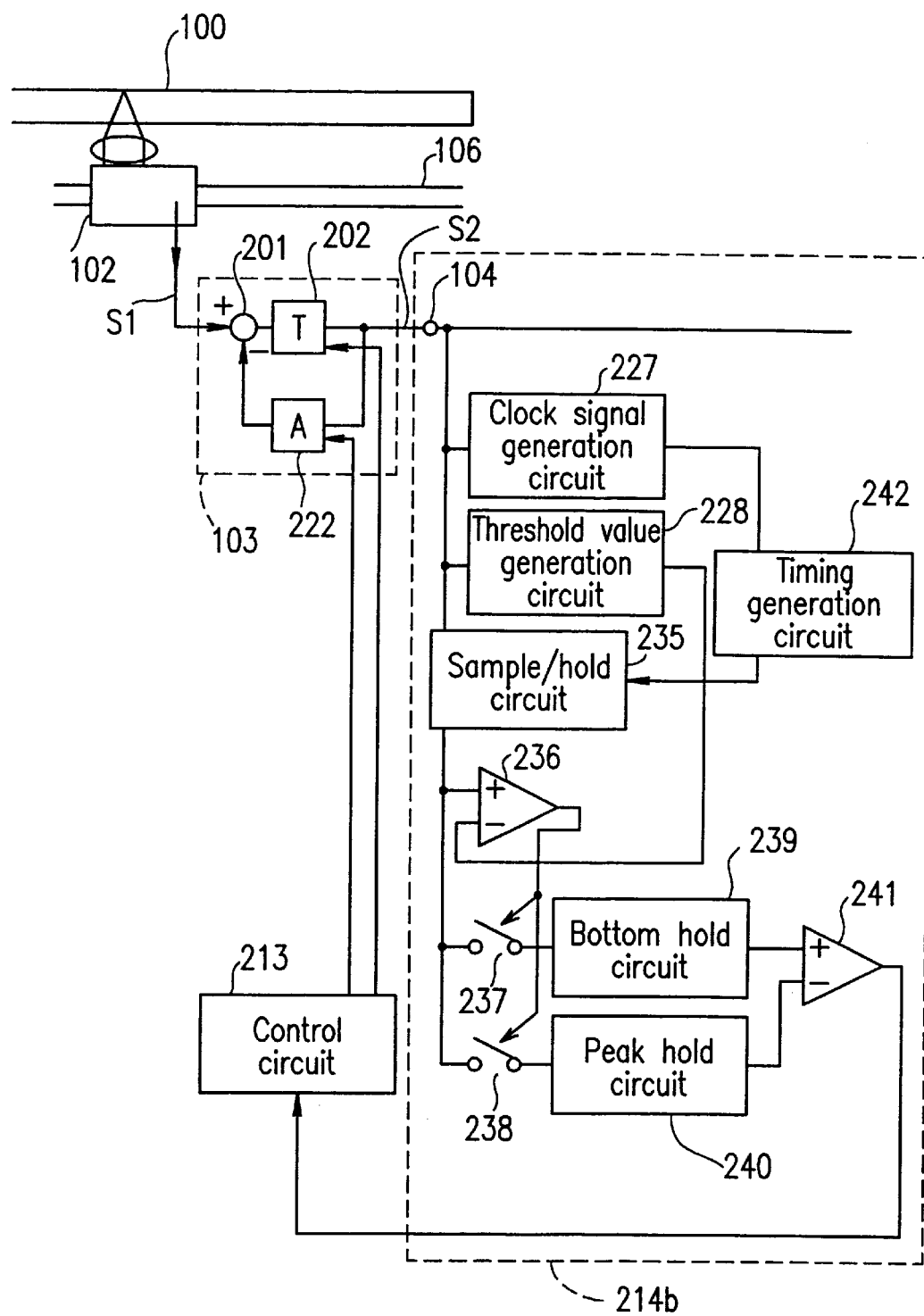
FIG. 18 is a block diagram illustrating the structure of an eye opening detection circuit 214b.

FIG. 18 is a block diagram illustrating the structure of an eye opening detection circuit 214b. FIG. 19 is a waveform diagram illustrating the waveforms at various points of the eye opening detection circuit 214b.

The eye opening detection circuit 214b optimizes the signal processing circuit 103 so as to maximize the opening of the eye pattern of the reproduction signal S2 output from the signal processing circuit 103. Specifically, the eye opening detection circuit 214b optimizes the delay time and the gain so as to maximize the opening of the eye pattern of the reproduction signal S2 output from the signal processing circuit 103.

The optical information processing apparatus 30 includes an optical head 102, a transportation member 106, the signal processing circuit 103, a control circuit 213, and the eye opening detection circuit 214b.

As shown in FIG. 18, the eye opening detection circuit 214b includes a clock signal generation circuit 227, a threshold value generation circuit 228, a timing generation circuit 242, a sample/hold circuit 235, a comparator 236, a switch 237, a switch 238, a bottom hold circuit 239, a peak hold circuit 240, and a comparator 241.

Since the eye opening detection circuit 214b includes the timing generation circuit 242 instead of the delay circuit 234 in the eye opening detection circuit 214a of FIG. 15, the eye opening detection circuit 214b holds signals with a different timing from that of the eye opening detection circuit 214a for eye opening detection.

As described above, the eye opening detection circuit 214a holds the reproduction signal S2 at times which are shifted by tw/2 from the rising edges of the clock signal. On the other hand, the eye opening detection circuit 214b holds the reproduction signal S2 at two different sets of times, i.e., at times which are shifted by tw/2−b from the rising edges of the clock signal and at times which are shifted by tw/2+b from the rising edges of the clock signal, where b is a positive number which is smaller than tw/2.

Figure 19:
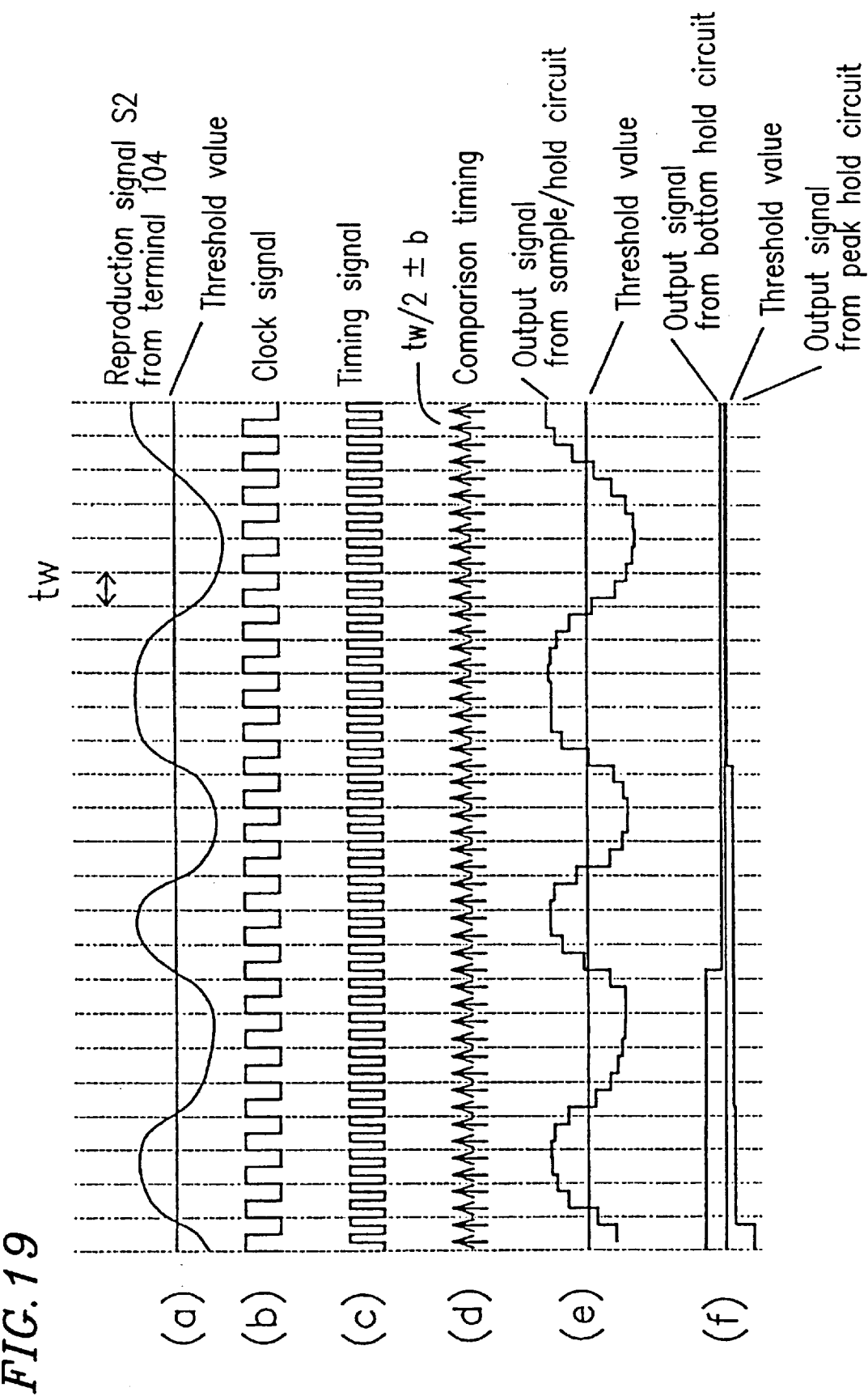
FIG. 19 is a waveform diagram illustrating the waveforms at various points of the eye opening detection circuit 214b.

The timing generation circuit 242 receives the clock signal generated by the clock signal generation circuit 227 (waveform (b) shown in FIG. 19) to generate a timing signal (waveform (c) shown in FIG. 19) based on the clock signal, and sends the generated timing signal to the sample/hold circuit 235.

The sample/hold circuit 235 holds the reproduction signal S2 shown in FIG. 19 at the rising edges (waveform (d) shown in FIG. 19) of the timing signal (waveform (c) shown in FIG. 19).

The subsequent operation of the eye opening detection circuit 214b is the same as that of the eye opening detection circuit 214a. The eye opening values which can be obtained from this circuit are the width $W_a$ and the width $W_b$ in the eye pattern shown in FIG. 12.

The algorithm for optimizing the delay time and the gain (coefficient) is similar to that shown in FIG. 17. Since the use of the eye opening detection circuit 214b results in a more frequent detection of the eye opening, the possibility of overcorrecting the reproduction signal S1 during the optimization of the delay time and the gain (coefficient) is minimized, thereby increasing the stability in the calculation of the optimum value.

(Example 4)

Figure 20:
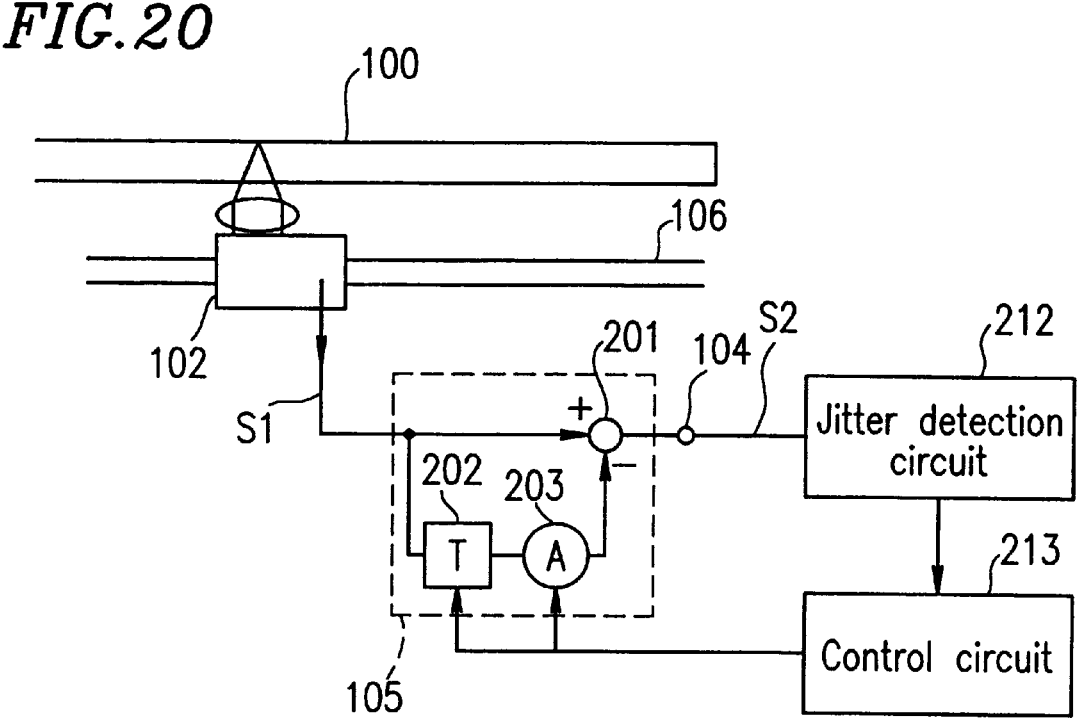
FIG. 20 is a block diagram illustrating an optical information processing apparatus 40 according to Example 4 of the present invention.

FIG. 20 is a block diagram illustrating an optical information processing apparatus 40 according to Example 4 of the present invention. The description of the constituent elements having the same functions as those described in Example 1 is omitted unless necessary.

A reproduction signal S1 which is output from an optical head 102 and input to a signal processing circuit 105 is coupled to a positive input terminal of a differential circuit 201 and a delay circuit 202. The reproduction signal S1 is delayed by a delay time T in the delay circuit 202, and the delayed signal is multiplied by A in an amplifier circuit 203. The multiplied signal is coupled to a negative input terminal of the differential circuit 201. The differential circuit 201 subtracts the signal coupled to its positive input terminal from the signal coupled to its negative input terminal so as to output the result of subtraction at a terminal 104.

The differential circuit 201 and the amplifier circuit 203 shown in FIG. 20 may be identical with those described in Examples 1 to 3.

The transfer function of the signal processing circuit 105 can be expressed as follows:

$$G+1-A'exp(-j\omega T) \qquad \text{eq. 4}$$

Hereinafter, the operation of the signal processing circuit 105 in FIG. 20 will be described with reference to FIGS. 21A to 21D.

Figure 21A:
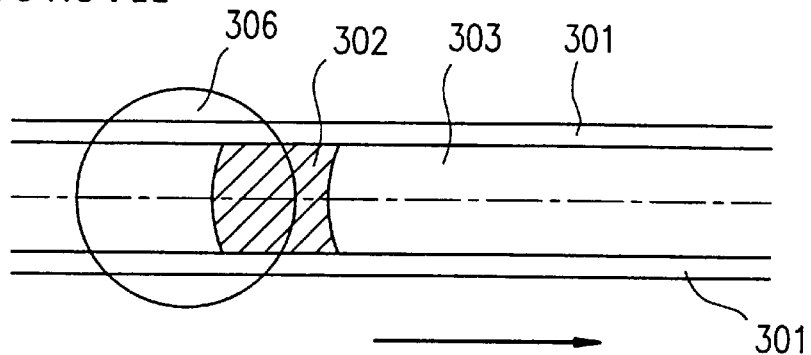
FIG. 21A is a schematic diagram illustrating a light beam 306 and a track on which one mark (A) 302 is written, where the light beam 306 makes a relative movement along the track in the direction of the arrow.

FIG. 21A is a schematic diagram illustrating a light beam 306 and a track on which one mark (A) 302 is written. The light beam 306 makes a relative movement along the track in the direction of the arrow.

Figure 21B:
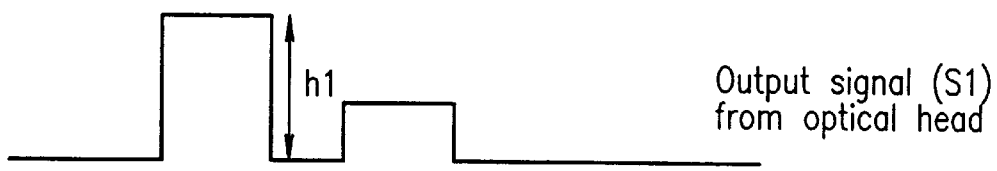
FIG. 21B is a timing diagram showing the reproduction signal S1 generated by a optical head 102 under the magnetic region enlargement reproduction method.
Figure 21C:
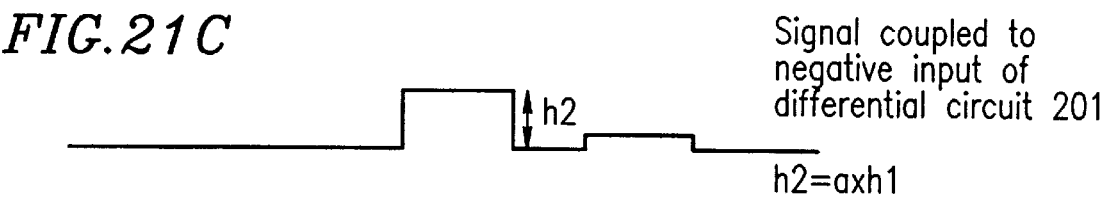
FIG. 21C is a timing diagram showing a signal which is input to a negative input terminal of a differential circuit 201.
Figure 21D:
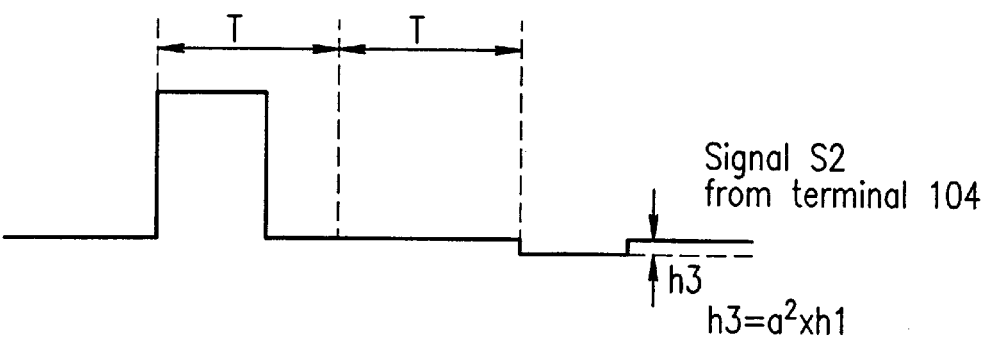
FIG. 21D is a timing diagram showing a reproduction signal S2 output from a terminal 104.
Figure 22:
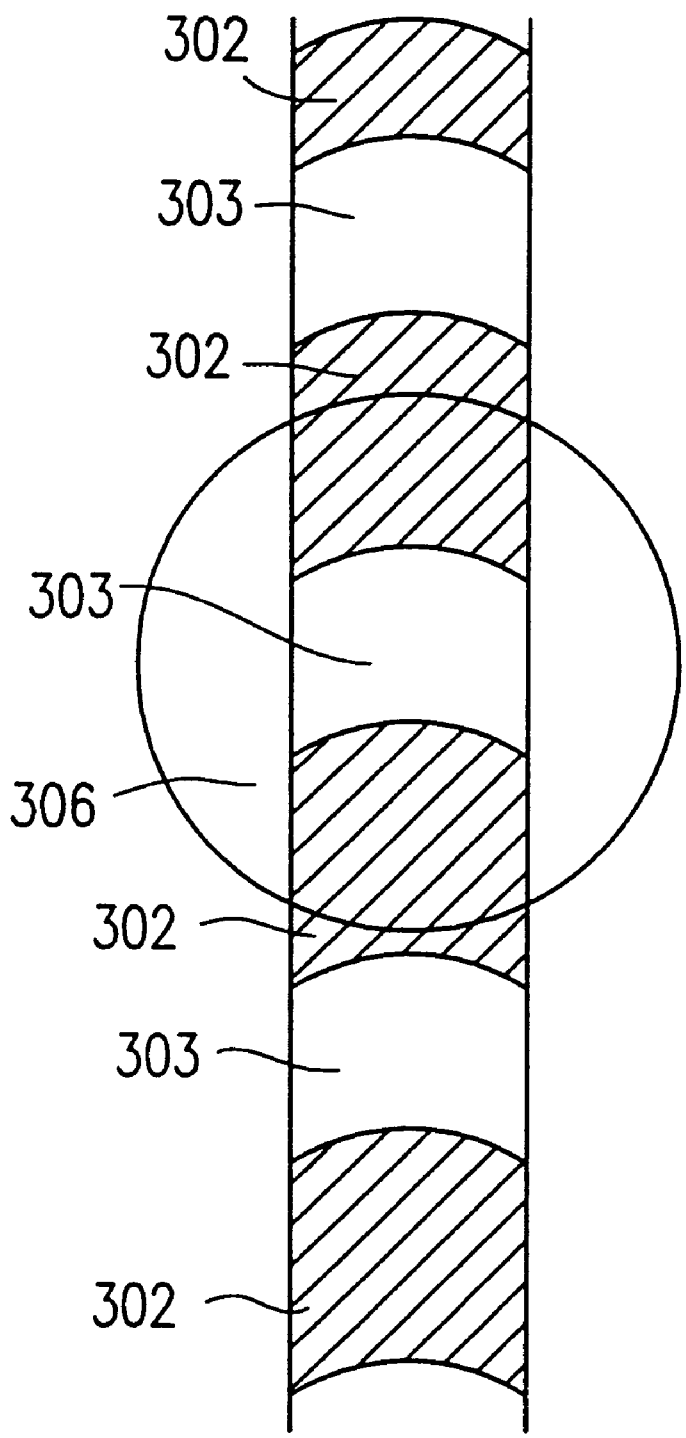
FIG. 22 is a diagram illustrating the relationship between marks and a fine light beam.

FIG. 21B is a timing diagram showing the reproduction signal S1 generated by the optical head 102, which is input to the positive input terminal of the differential circuit 201 under the magnetic region enlargement reproduction method. FIG. 21C is a timing diagram showing a signal which is input to the negative input terminal of the differential circuit 201. FIG. 21D is a timing diagram showing the reproduction signal S2, which is output from the terminal 104. Thus, the delay time T and the gain A can be optimized by a jitter detection circuit 212 and a control circuit 213 of the optical information processing apparatus 40.

The method for optimizing the delay time T of the delay circuit 202 and the gain A of the amplifier circuit 203 may be similar to those described in Examples 2 and 3. For example, the jitter detection circuit 212 and the control circuit 213 may have the same configurations as those of the jitter detection circuit 212 and the control circuit 213 of the aforementioned optical information processing apparatus 20.

In the present example, as seen from FIG. 21D, a pulse in the opposite direction is left at a time which is delayed by a period equal to 2T from the signal to be restored, thereby resulting in a larger jitter than in the case of employing the control circuit 103 in Example 1. However, according to the present example, no influence of a given mark lingers after the 2T period. Thus, the reproduction signal S2 is not under a long-term influence of any given mark.

Although the signal processing circuit according to the present example incorporates a delay circuit, any other configuration may be adopted as long as the transfer function expressed by eq. 4 is realized.

The error rate during information reproduction can be further reduced by employing a usual waveform equalization circuit after the signal processing circuit according to the present example.

Although the illustrated magnetic region enlargement reproduction method for enlarging recorded marks according to the present example is based on the shift of magnetic partitions, the present example is not limited to such principles. For example, the use of liquid crystal may enable mark recording based on differential orientations of molecules having polarization anisotropy, as well as virtual enlargement of the recorded marks during reproduction.

In the present example, the eye opening detection circuit 214 of Example 3 may be employed, instead of the jitter detection circuit 212, for optimization of the delay time T and the gain A.

Although the signal processing circuits according to Examples 1 to 3 each incorporate a delay circuit, any other configuration may be employed that is capable of realizing the transfer function expressed by eq. 3.

The error rate during information reproduction can be further reduced by employing a usual waveform equalization circuit after the signal processing circuit according to any of Examples 1 to 3.

Although Examples 1 to 4 illustrated embodiments where magnetooptical disks having three magnetic layers are employed, the number of layers is not limited three as long as the enlargement of recorded marks occurs during reproduction based on the shift of magnetic partitions or the like, as described above. The effect provided by the present example can be similarly attained similar also in embodiments where more than three magnetic layers are employed and more stable shifts of magnetic partitions occur.

Although the illustrated magnetic region enlargement reproduction methods for enlarging recorded marks according to Examples 1 to 4 are based on the shift of magnetic partitions, the present example is not limited to such principles. For example, the use of liquid crystal may enable mark recording based on differential orientations of molecules having polarization anisotropy, as well as virtual enlargement of the recorded marks during reproduction.

An optical information processing apparatus according to the present invention includes: an optical head for radiating a light beam onto an information storage medium and generating a reproduction signal from the light beam reflected and/or diffracted from the information storage medium, the information storage medium carrying optically readable information recorded thereon; a transportation member for causing a relative movement of the optical head with respect to the information storage medium; and a signal processing circuit for receiving the reproduction signal generated by the optical head and processing the reproduction signal. The information which can be read from the information storage medium irradiated with the light beam includes first information from a mark near a boundary between a region which is heated by the light beam to no less than a predetermined temperature and a first region which is at a temperature below the predetermined temperature, and second information from a mark near a boundary between the region which is heated to no less than the predetermined temperature and a second region which is at a temperature below the predetermined temperature. As a result, it is possible to record information on the information storage medium at a high recording density.

The signal processing circuit according to the present invention is capable of separating the first information from the second information, or vice versa, during restoration of the information recorded on the information storage medium from a reproduction signal. As a result, the information recorded on an information storage medium at a high recording density can be reproduced with a low error rate.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical information processing apparatus comprising:

an optical head for radiating a light beam onto an information storage medium and generating a reproduction signal from the light beam reflected and/or diffracted from the information storage medium, the information storage medium carrying optically readable information recorded thereon;

a transportation member for causing a relative movement of the optical head with respect to the information storage medium; and a signal processing circuit for receiving the reproduction signal generated by the optical head and processing the reproduction signal, wherein the reproduction signal comprises first information from a mark near a boundary between a region which is heated by the light beam to no less than a predetermined temperature and a first region which is at a temperature below the predetermined temperature, and second information from a mark near a boundary between the region which is heated to no less than the predetermined temperature and a second region which is at a temperature below the predetermined temperature, and wherein the signal processing circuit separates the first information from the second information, or vice versa, thereby obtaining from the reproduction signal the information recorded on the information storage medium.

2. An optical information processing apparatus according to claim 1, wherein the reproduction signal is a sum of X plus Y, where X is the information signal recorded in the information storage medium and Y is a signal which is obtained by delaying the information signal and multiplying the information delayed information signal by a constant.

3. An optical information processing apparatus according to claim 2, wherein the signal processing circuit has a transfer function represented by:

$$1/\{1+A'\exp(-j\omega T)\}$$

where A is a constant; j is the imaginary unit; $\omega$ is an angular frequency of the reproduction signal generated by the optical head; and T is a delay time.

4. An optical information processing apparatus according to claim 2, wherein the signal processing circuit has a transfer function represented by:

$$1-A'\exp(-j\omega T)$$

where A is a constant; j is the imaginary unit; $\omega$ is an angular frequency of the reproduction signal generated by the optical head; and T is a delay time.

5. An optical information processing apparatus according to claim 1, wherein the signal processing circuit is optimized so as to minimize a jitter of the reproduction signal having been processed by the signal processing circuit.

6. An optical information processing apparatus according to claim 1, wherein the signal processing circuit is optimized so as to maximize an eye pattern opening of the reproduction signal having been processed by the signal processing circuit.

7. An optical information processing apparatus according to claim 1, wherein the optical information processing apparatus further comprises the information storage medium, the information storage medium comprising a magnetic recording film for storing a signal in the form of magnetization orientation, enlargement of the marks being effected by movement of a magnetic partition, and the optical head detecting the magnetization orientation of the magnetic recording film and outputting the reproduction signal.

8. An optical information processing apparatus according to claim 3, wherein the constant A and the delay time T are determined so as to minimize a jitter of the reproduction signal having been processed by the signal processing circuit.

9. An optical information processing apparatus according to claim 4, wherein the constant A and the delay time T are determined so as to minimize a jitter of the reproduction signal having been processed by the signal processing circuit.

10. An optical information processing apparatus according to claim 3, wherein the constant A and the delay time T are determined so as to maximize an eye pattern opening of the reproduction signal having been processed by the signal processing circuit.

11. An optical information processing apparatus according to claim 4, wherein the constant A and the delay time T are determined so as to maximize an eye pattern opening of the reproduction signal having been processed by the signal processing circuit.

* * * * *